US005788740A

United States Patent [19]
Chase

[11] Patent Number: 5,788,740
[45] Date of Patent: Aug. 4, 1998

[54] METHOD FOR THE HYDROMETALLURGICAL SEPARATION AND RECOVERY OF BIOLOGICAL NUTRIENTS, LEAD, GYPSUM AND CADMIUM FROM RAW MATERIALS

[75] Inventor: Robert Chase, Yakima, Wash.

[73] Assignee: Bay Zinc Company, Inc., Moxee, Wash.

[21] Appl. No.: 398,799

[22] Filed: Mar. 6, 1995

[51] Int. Cl.$^6$ ............................................. C22B 3/18
[52] U.S. Cl. ......................... 75/724; 75/725; 75/726; 75/731; 75/961; 423/434; 423/555; 423/DIG. 17
[58] Field of Search ........................... 75/724, 726, 961, 75/725, 731; 423/434, 555, DIG. 17

[56] References Cited

U.S. PATENT DOCUMENTS

| | | | |
|---|---|---|---|
| 3,434,947 | 3/1969 | Steinveit | 204/119 |
| 3,954,953 | 5/1976 | Satterwhite et al. | 423/138 |
| 3,985,857 | 10/1976 | Menendez et al. | 423/106 |
| 4,124,462 | 11/1978 | Reinhardt et al. | 423/24 |
| 4,219,354 | 8/1980 | Rastas et al. | 75/101 |
| 4,220,627 | 9/1980 | Fugleberg et al. | 423/42 |
| 4,252,775 | 2/1981 | Davister et al. | 423/98 |
| 4,272,341 | 6/1981 | Lamb | 204/118 |
| 4,305,914 | 12/1981 | Pammenter et al. | 423/146 |
| 4,378,275 | 3/1983 | Adamson et al. | 204/119 |
| 4,536,214 | 8/1985 | Ochs et al. | 75/101 |
| 4,551,213 | 11/1985 | Wilson | 204/111 |
| 4,610,721 | 9/1986 | Duyvesteyn et al. | 75/961 |
| 4,610,722 | 9/1986 | Duyvesteyn et al. | 75/97 |
| 4,614,543 | 9/1986 | Duyvesteyn et al. | 75/961 |
| 4,710,367 | 12/1987 | Wong et al. | 423/335 |
| 4,762,554 | 8/1988 | Lazcano-Navarro | 75/961 |
| 4,778,520 | 10/1988 | Spink et al. | 75/120 |
| 4,789,529 | 12/1988 | Robinson et al. | 423/109 |
| 4,888,053 | 12/1989 | Grayson et al. | 75/101 |
| 5,078,786 | 1/1992 | Peters et al. | 75/432 |
| 5,139,567 | 8/1992 | Matsuoka et al. | 75/500 |

*Primary Examiner*—Melvyn Andrews
*Attorney, Agent, or Firm*—Stratton Ballew PLLC

[57] ABSTRACT

Methods and apparatus for the hydrometallurgical separation and recovery of biological nutrients, cadmium, lead, and gypsum from raw materials such as electric arc furnace flue dust. Biological nutrients, including zinc and iron, are selectively separated and recovered from raw materials, including metals and metal oxides, and are selectively and variably recombined, to achieve a biological nutrient product which a desired relative concentration of zinc and iron. The process is a closed system generating no solid waste, no liquid water or acid waste streams, and whereby gypsum, and substantially all hazardous wastes such as lead and cadmium, are separated and recovered from raw material for sale as commercial products.

17 Claims, 7 Drawing Sheets

| FIG. 6 |
| FIG. 7 | ves, concern over the potential adverse environmental
METHOD FOR THE HYDROMETALLURGICAL SEPARATION AND RECOVERY OF BIOLOGICAL NUTRIENTS, LEAD, GYPSUM AND CADMIUM FROM RAW MATERIALS

TECHNICAL FIELD SECTION

The invention pertains to methods and apparatus for separation and recovery of metals and other substances from raw materials. More specifically the invention is directed to methods and apparatus for hydrometallurgical separation and recovery of biological nutrients, cadmium, lead, and gypsum from raw materials such as electric arc furnace flue dust.

BACKGROUND OF THE INVENTION

Biological nutrients are elements which are essential for plants and animals. All biologically essential elements are characterized as either macronutrients, secondary nutrients, or micronutrients. Macronutrients are those elements which are used by plants and animals in relatively greater amounts and constitute from about 0.5% to 3.0% of the dry weight of the organism. Macronutrients are nitrogen, phosphorous, and potassium. These elements represent about 99% of the total nutrients used by plants or animals. Calcium, sulfur, and magnesium are also essential as secondary nutrients to plants and animals, and are frequently used as additives to animal feed or fertilizer supplements.

Micronutrients are those elements which are present in plants and animals in amounts ranging from 10 to 10,000 parts per million (ppm). Essential plant micronutrients include zinc, iron, manganese, boron, molybdenum, and copper. Zinc, iron, and manganese are also essential animal micronutrients. Many of these micronutrients, including zinc and iron, are used as fertilizer supplements for plants or as additives to animal feed.

Plants and animals are usually able to obtain all the nutrients which they require from the available food or soil. This is especially true in natural environments which are relatively unimpacted by man. Unfortunately, many plants and animals in managed agricultural environments cannot naturally acquire all biological nutrients which they need, and their soil and food must be supplemented with macronutrients, secondary nutrients, and micronutrients. Selected nutrient supplements can also be used to quickly and economically achieve desired animal characteristics, or desired crop yields. Consequently, a substantial agricultural market has developed for nutrient supplements, including zinc, iron, magnesium, manganese, calcium, and sulfur.

Providing the agricultural market with high quality biological nutrient supplement products in an economically profitable manner is ideally accomplished by processing a raw material which has a high content of such elements in an easily purified form. Many manufacturing industries produce waste streams or byproducts which contain chemicals hazardous to the environment. Some of these hazardous waste streams and byproducts also contain chemicals which are potentially usable as nutrients, if such chemicals could be safely and economically separated from the manufacturing waste stream or byproducts.

Electric arc furnace flue dust (EAF dust), generated in large quantities by electric arc furnaces common to the steel industry, is an example of a hazardous manufacturing waste stream or byproduct which contains not only hazardous chemicals but also chemicals which could be used as biological nutrients. EAF dust is comprised primarily of metals and the oxides of metals such as iron, zinc, calcium, lead, magnesium, manganese, cadmium, copper and chromium. The United States Environmental Protection Agency (EPA) strictly regulates the emission and disposal of EAF dust, and commonly refers to EAF dust as "K061"—the EPA number assigned to EAF dust. The presence of many of these metals and metal oxides makes EAF dust an excellent potential raw material for producing biological nutrients.

Galvanizer's dross, brass mill dust, and copper smelter flue dust are other examples of industrial wastes which contain both hazardous chemicals, and chemicals useful as biological nutrients. More specifically, many of these waste streams, including EAF dust, contain lead and cadmium, which are hazardous to plants and animals, in addition to zinc, iron and other chemicals which are potentially useful as biological nutrients. Although it is known to attempt to use some of these waste streams to produce biological nutrients, there has been no economic or regulatory incentive to develop an environmentally sound approach to dealing with the cadmium and lead contaminants also present in the raw material.

Prior to Congress passing The Resource Conservation and Recovery Act (RCRA), the one-step partial acid digestion of EAF dust was a good example of a manufacturing process to separate and recover nutrients from an industrial waste stream. EAF dust was reacted with a weak solution of sulfuric acid and sufficient water to product a near saturated solution. The metal species which were readily soluble in sulfuric acid were removed from the flue dust, leaving a solid phase composed primarily of oxides and sulfates of iron, calcium, and lead, along with dirt. The mixture was separated into a clear liquid phase and a solid phase (also called "filter cake"). The liquid phase was further refined to remove any dissolved cadmium or chromium, and was sold as a zinc fertilizer. The filter cake was disposed of in a land fill. An alternate method of manufacturing fertilizer from EAF dust was to react the dust with sulfuric acid and a small amount of water in a granulator, thereby converting the entire mixture into a granular product. This product was also sold as a zinc fertilizer. In this process, there was no filter cake generated for disposal.

With the implementation of RCRA, the subsequent adoption of "land ban restrictions", filter cake can no longer be disposed of in land fills, even at a hazardous waste dump. This has rendered the previous process of manufacturing a "clean" zinc fertilizer from EAF unsatisfactory. The use of EAF in the manufacture of zinc based fertilizer is still specifically exempt from regulation under RCRA. Therefore, granular product may still be used without restriction. This practice results in a granular product remaining contaminated with lead and cadmium. The lead is present in a very insoluble sulfate form, and the level of cadmium is generally low. Historically, neither have been believed to pose any significant health risks to plants, or the people who consume them. Some government agencies and public interest groups are now suggesting that it is possible that extremely low levels of lead or cadmium, not harmful to a particular plant, might accumulate over long periods of time in soils and potentially create an environmental hazard.

Because of increased perception driven, rather than data driven, concern over the potential adverse environmental impacts of industrial processes and by-products, manufacturing processes previously considered acceptable and environmentally benign have come under scrutiny by industry, government and citizens. Various regulatory restrictions are anticipated to be developed and promulgated, and anticipation of such possible regulations are forcing fundamental changes in industrial methods and practices. Specifically, it is expected that Canada, Australia and the state of California will announce new proposed regulations establishing maximums for cadmium and lead levels, which will require fundamental changes in the way nutrient products are manufactured from raw materials such as EAF dust, galvanizer's dross, and brass mill dust. Other states and counties will likely follow their lead. Under the combination of these anticipated guidelines, and current regulation under RCRA, it is not possible to dispose of the lead contaminated solid phase from the digestion process, nor would it be possible to sell solvated or granular nutrient products containing even relatively low levels of cadmium or other heavy metals.

The anticipated regulations are particularly significant to the original generators of the industrial waste streams used in the production of bionutrient products. It is the general legal policy of the United States, and its states and territories, to hold all generators of hazardous waste liable for all adverse environmental contamination caused by that waste, even if the contamination occurred as the result of a third party's actions. This "environmental justice" policy is likely to remain a landmark of U.S. law. This policy is significant to understanding the need for this invention. As an example of this policy in action under the new proposed EPA regulations, if a steel mill owner sold EAF dust to a bionutrient manufacturer, and the bionutrient manufacturer sold bionutrient products contaminated with cadmium and improperly disposed of their solid phase waste stream contaminated by lead, then both the bionutrient manufacturer and the steel mill that originally sold the EAF dust would be liable for any environmental clean-up required as a result of the bionutrient manufacturer's actions. Consequently, unless the owners and operators of steel mills, galvanizing plants, brass mills, copper smelters, and other manufacturing facilities are confident that bionutrient manufacturers purchasing their raw material waste streams are able to produce bionutrient products in compliance with EPA regulations, they will not sell their raw material. Loss of these raw material sources to bionutrient producers would have two disastrous impacts. First, the owners and operators of steel mills, galvanizing plants, and brass mills, and other manufacturing facilities are left with large quantities of waste which they cannot dispose of economically. Even if performed without damage to the environment, the dumping of materials classified as toxic is wasteful, expensive, and totally prohibited. Second, indispensable bionutrient products will become scarce and costly, significantly driving up prices for agricultural products and lowering the standard of living in the United States.

To achieve the separation of desirable bionutrient elements from potentially toxic components such as lead and cadmium, in a manner which is environmentally sound, a process must be employed which obtains the beneficial nutrients from a raw material in a useable form, and which also gathers and concentrates the toxic elements in a manner that does not create an environmental burden. The bionutrient production facility which achieves these goals must be designed and operated in such a way as to eliminate any potentially environmentally damaging byproducts while optimizing the use and efficiency of all material streams and processes. The conversion of waste materials into useful commercial products for other industrial processes would be a key element to the success of such a facility.

SUMMARY OF INVENTION

The invention achieves these objects, and other objects and advantages which will become apparent from the description which follows, by providing a two-reactor digestion process for the separation and recovery of biological nutrients (bionutrients) from a raw material including metals and metal oxides, which process results in separate zinc rich and iron rich liquid phases that can be combined in selected ratios to create solvated or granulated bionutrient products with a relative concentration ratio of zinc and iron which can be different from the relative concentration ratio of zinc and iron in the original digested raw material.

It would further be desirable to have a process for the separation and recovery of cadmium from the liquid phase, or liquid phases, generated by acid digestion during the separation and recovery of bionutrients from raw materials including metals and metal oxides.

It would also be desirable to have a process for the separation and recovery of lead and gypsum from the solid phase waste generated by acid digestion during the separation and recovery of bionutrients from raw materials including metals and metal oxides.

Finally, it would be desirable to have a process for the separation and recovery of bionutrients from a raw material including metals and metal oxides, which process is essentially a closed system generating no solid waste, no liquid water or acid waste streams, and whereby substantially all hazardous wastes, and especially lead and cadmium, are separated and recovered from the raw material for sale as commercial products.

BRIEF DESCRIPTION OF THE DRAWINGS

FIG. 1A shows the interrelation of schematic flow diagrams FIGS. 1 and 5.

FIG. 1B shows the interrelation of schematic flow diagrams FIGS. 1 and 6.

FIG. 2A shows the interrelation of schematic flow diagrams FIGS. 2 and 5.

FIG. 2B shows the interrelation of schematic flow diagrams FIGS. 2 and 6.

FIG. 3A shows the interrelation of schematic flow diagrams FIGS. 3 and 5.

FIG. 3B shows the interrelation of schematic flow diagrams FIGS. 3 and 6.

FIG. 5A shows the interrelation of schematic flow diagrams FIGS. 5 and 7.

DETAILED DESCRIPTION

The invention provides methods and apparatus to manufacture a bionutrient product from a raw material, while achieving useful byproducts which include cadmium, gypsum and lead. EAF dust is a typical raw material and is especially suitable due to its relatively high concentrations of zinc and iron. EAF dust contains a mixture of various component metals, metal oxides, alkali metal oxides and alkaline-earth metal oxides along with silicon oxides. It is also contemplated that other raw materials such as galvanizer's dross, brass mill dust or copper smelter flue dust may be used as a supplement to, or substitute for, EAF dust as a raw material.

Manufacture of Bionutrient Products with Selectively Variable Relative Concentrations of Zinc and Iron

DESCRIPTION OF FIG. 1

Figure 1:
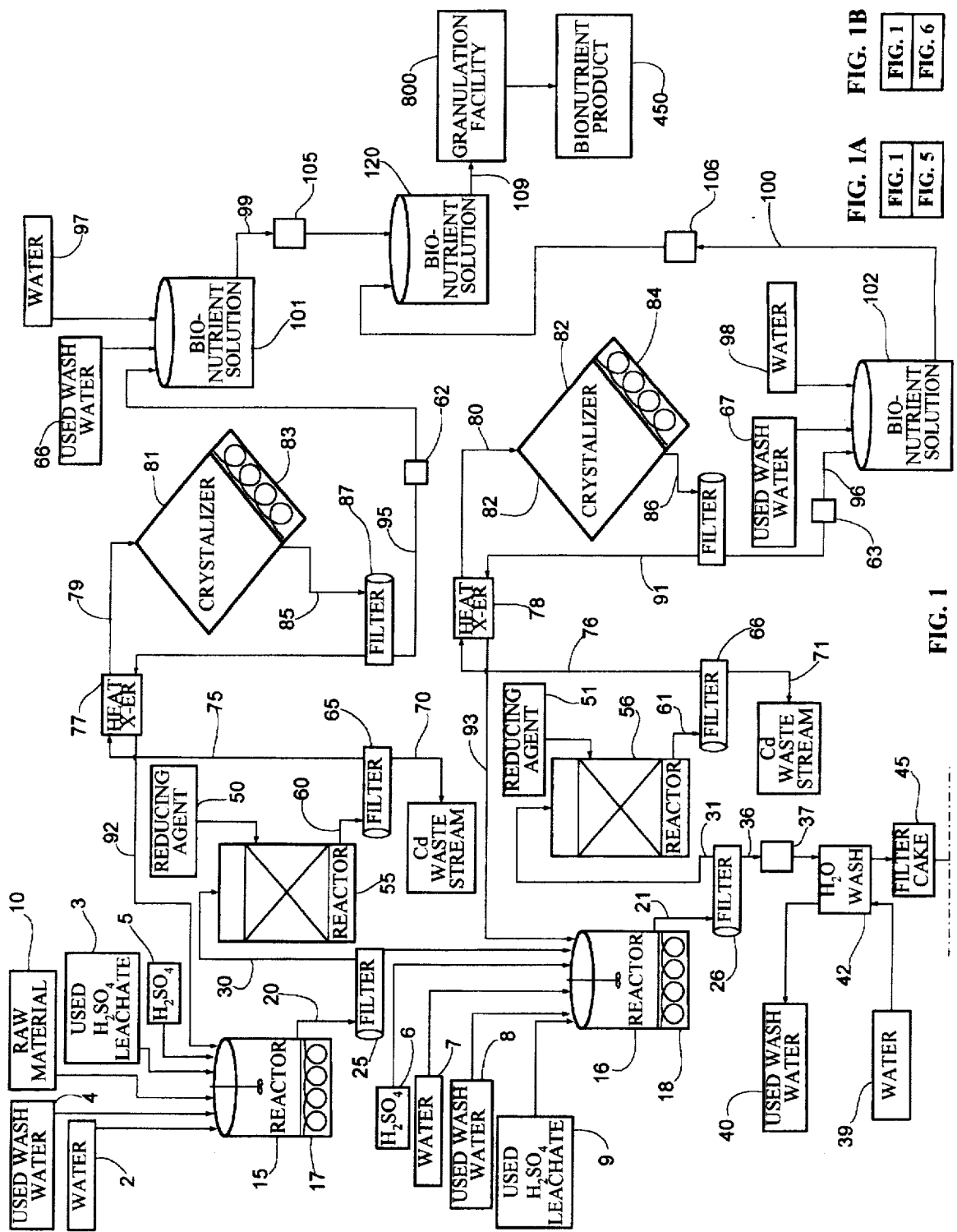
FIG. 1 A notated schematic flow diagram of a two digestion method and apparatus yielding bionutrient products, cadmium, and a filter cake.

A notated schematic flow diagram of a preferred embodiment of the invention is shown in FIG. 1. In this embodiment of the invention, concentrated sulfuric acid 5 is combined in less than stoichiometric ratios with a raw material 10 to form a first mixture 20 in first digestion reactor 15 for metal solubilization. In an alternate embodiment of the invention, sulfuric acid may be replaced or supplemented by other vigorous acids, such as hydrochloric acid.

First digestion reactor 15 is preferably a continuous back-mix reactor, although a variety of other reactor types are also contemplated, including continuous plug flow reactors, and agitated batch reactors. Water 2 may also be added to first mixture 20 in first digestion reactor 15 in a quantity necessary to produce a near-saturated solution, preferably achieved at approximately 40% dry solids or approximately 42 degrees Baumé (° Bé).

During the initial process start-up phase of this process and apparatus, pre-heated first mother liquor 92 or used wash water 4 are not yet available for possible addition to first mixture 20. However, after the initial start-up phase, pre-heated first mother liquor 92 or used wash water 4 may all collectively or separately be recycled for use in providing first mixture 20. In this embodiment of the invention, the primary sources of used wash water 4 during continuous operation include used wash water 40, used wash water 561 (See FIG. 5), and used wash water 679 (See FIG. 6), but other sources of used wash water are also contemplated.

Most metal oxides, other than iron oxides, present in raw material 10 are leached into solution by transformation into metal sulfates in first mixture 20 in first digestion reactor 15. The digestion process in first digestion reactor 15 is more accurately described as a partial digestion process, as the iron present in raw material 10 is deliberately not leached into solution. Substantially all the iron present in raw material 10 is likely to be in the form of ferric oxide, $Fe_2O_3$, which is insoluble at a pH greater than pH 1.0. Accordingly, the pH in first digestion reactor 15 is maintained at greater than pH 1.0, and is preferably maintained in the range between pH 1.0 and pH 2.0. This pH range results in the successful leaching of substantially all of the zinc present in raw material 10 into solution, while leaving the majority of the iron, in the ferric state, in first solid phase 35.

While sulfuric acid 5 is used in first mixture 20 to create the resultant sulfate products which are desired as bionutrients, in an alternate embodiment of the invention, sulfuric acid may be replaced or supplemented by other vigorous acids, such as hydrochloric acid.

Although significant heat is evolved from the addition of sulfuric acid 5 (preferably commercial grade, approximately 93% $H_2SO_4$), a first heat source 17 may also be necessary to provide additional heat to facilitate the digestion process. First heat source 17 is external to first digestion reactor 15 to minimize fouling. The purpose of first heat source 17 is to maintain first mixture 20 at approximately 180° F. to 200° F. (82° C. to 93° C.), for a period ranging from 1 to 2 hours, but preferably approximately 1 hour to accomplish the desired partial digestion process. This variable time period is necessary to selectively solubilize the zinc present in raw material 10 into the liquid phase present in reactor 15, while leaving the majority of the ferric iron in the solid phase present in reactor 15. The amount of time required depends upon the quantity of zinc present in raw material 10.

Because this is a continuous process, adjustments to the activity in reactor 15 are made based upon observations of first bionutrient crystal product 95 by analyzing device 62. The partial digestion process in reactor 15 is considered complete when data from analyzing device 62 shows that the zinc to iron ratio in the liquid phase emanating from reactor 15 has reached the desired level of zinc concentration for the final zinc rich first bionutrient crystal product 95, or the resultant first bionutrient solution 99.

Raw material 10 may be supplemented with a material high in zinc to increase the zinc content in the resultant first bionutrient solution 99. This supplemented material may be EAF dust, brass mill dust, galvanizer's dross, copper smelter flue dust or any suitable raw material with a relatively high concentration of zinc and a correspondingly low concentration of impurities.

Upon completion of the digestion process in reactor 15, a first liquid phase 30 and a first solid phase 35 are separated from first mixture 20 by first separation device 25. In a preferred embodiment of the invention this separation means 25 can be a gravity settler, centrifugal filter, or a continuous filter drum.

First solid phase 35 is further processed following filtration by first separation device 25, as will be explained following the description of how first liquid phase 30 is processed.

First liquid phase 30 emanating from first separation device 25 is combined with a first reducing agent 50 to form a second mixture 60 in a first reduction reactor 55. In addition to desirable bionutrients, first liquid phase 30 also contains undesirable constituents such as cadmium, copper and chromium. Also, the relatively small amount of iron initially present in second mixture 60 is in the ferric, or +3 valence state, which is not readily available for assimilation by biological organisms.

First reduction reactor 55 is preferably a tower which is packed with a first reducing agent 50. This type of reactor is also referred to as a packed column reactor. First reducing agent 50, preferably zinc metal or iron metal, reduces the relatively small amounts of iron in second mixture 60 from ferric to the more soluble ferrous, or +2 valence state, which is available for assimilation by biological organisms. First reducing agent 50 also reacts with cadmium, copper and chromium, converting them to base metal, or the 0 (zero) valence state. In this embodiment, second mixture 60 is considered ready for further processing when the cadmium concentration is determined to be less than 100 ppm cadmium, as measured with a spectrophotometer or other analyzing device (not shown).

In an alternative embodiment of the invention, additional metallic zinc first reducing agent 50 may be added to first reduction reactor 55, along with the corresponding stoichiometric quantity of sulfuric acid, to increase the zinc sulfate content in the resulting second mixture 60. Increasing the zinc content of second mixture 60 results in an increase in the zinc content of first bionutrient crystal product 95, or first bionutrient solution 99.

Upon completion of the reduction process in first reduction reactor 55, a second liquid phase 75 and a second solid phase 70 are separated from second mixture 60 by second separation device 65. In a preferred embodiment of the invention, second separation device 65 is a duplex cartridge, semicontinuous filter, or continuous drum filter, although the use of other separating devices is contemplated.

Second solid phase 70 includes as a major component metallic cadmium, metallic copper, and metallic chromium, available for commercial use or sale.

While second solid phase 70 contains the bulk of the cadmium and chromium present in the original raw material 10, second liquid phase 75 still contains small quantities of lead, cadmium and chromium.

Accordingly, these remaining impurities are separated from second liquid phase 75. In a preferred embodiment of the invention, the separation of these impurities from second liquid phase 75 is accomplished through a purification process, although other separation processes are contemplated. One type of purification process to separate impurities from second liquid phase 75 which has been used successfully is fractional crystallization.

In this embodiment of the fractional crystallization process, the second liquid phase 75 is first pre-cooled in a first heat exchanger 77, yielding pre-cooled second liquid phase 79. Recycled first mother liquor 90 from third separation device 87 is also pre-heated in first heat exchanger 77 prior to being recycled as preheated first mother liquor 92 for use in providing first mixture 20 in first digestion reactor 15. Pre-cooled second liquid phase 79 is introduced into a first crystallizer 81 and recirculated between the refrigerated crystallizer cooler 83 and the first crystallizer 81 until crystals begin to form at approximately 20° F. to 70° F. (−6° C. to 21° C.). When the crystallization process is completed, a first slurry 85 is formed, comprised of suspended bionutrient crystals and a mother liquor. The suspended bionutrient crystals formed in first crystallizer 81 are substantially purer than the mother liquor in which they are suspended, and are comprised primarily of iron sulfate hydrate and zinc sulfate hydrate crystals. Once separated from the mother liquor, these bionutrient crystals are a completed bionutrient crystal product.

In an alternate embodiment of the invention (not shown), second liquid phase 75 is directly introduced into first crystallizer 81, with no precooling or heat exchange.

Upon completion of the crystallization process in first crystallizer 81, a first mother liquor 90 and first bionutrient crystal product 95 are separated from first slurry 85 by third separation device 87. In a preferred embodiment of the invention, third separation device 87 is a centrifugal filter, or a continuous drum filter. However, because of the high density differential between the solid phase and the liquid phase of first slurry 85, a mere strainer or screen could also be effectively used as third separation device 87, although the use of other separating devices is contemplated.

Following filtration by third separation device 87, first bionutrient crystal product 95 is analyzed by first analyzing device 62 to determine the concentration of zinc and iron. In a preferred embodiment of the invention, first analyzing device 62 is a mass spectrometer or spectrophotometer, although the use of other analyzing devices is contemplated. This analytical information is then used to control the partial digestion process of raw material 10 by sulfuric acid 5 in first mixture 20 in first digestion reactor 15, so that the desired concentrations of zinc and iron in first bionutrient crystal product 95 can be achieved. The partial digestion process in first digestion reactor 15 is controlled primarily by adjusting the amount of sulfuric acid 5 in first mixture 20, but can also be controlled by adjusting the total time and temperature of the partial digestion process.

The concentration of zinc and iron in first bionutrient crystal product 95 can be altered to accommodate customers' particular needs, or the needs of the particular plant or animal with which the resulting bionutrient product will be used as a fertilizer or dietary supplement.

First mother liquor 90 is used to pre-cool second liquid phase 75 in first beat exchanger 77. This process also results in recycled first mother liquor 90 being pre-heated in first beat exchanger 77 prior to being recycled as preheated first mother liquor 92 for use in providing first mixture 20 in first digestion reactor 15. In an alternate embodiment of the invention (not shown), first mother liquor 90 is recycled directly for use in providing first mixture 20 in first digestion reactor 15.

First bionutrient crystal product 957 preferably in the form of heptahydrate crystals, are re-solvated as necessary, in water 97 or recycled used wash water 66, either in combination or separately, to form a first bionutrient solution 99 which is approximately 60% water by weight. First bionutrient solution 99 is a solution of relatively high zinc concentration and relatively low iron concentration.

First bionutrient solution 99 can be stored in first storage container 101 for commercial sale or use as a zinc rich solvated bionutrient product (not shown), or for storage prior to transfer directly to granulation facility 800 (transfer path not shown), or for storage prior to transfer to combined storage container 120.

As mentioned above, first solid phase 35 is further processed following filtration by first separation device 25. The purpose of further processing first solid phase 35 in this embodiment of the invention is to create an iron rich bionutrient solution (approximately 20%—25% iron, and approximately 14% or less zinc) for use separately, or in combination with first bionutrient solution 99, which is a zinc rich bionutrient solution.

First solid phase 35 is combined with concentrated sulfuric acid 6 in excess of stoichiometric ratios to form a third mixture 21 in second digestion reactor 16 for metal solubilization. Second digestion reactor 16 is preferably a continuous back-mix reactor, although a variety of other reactor types are also contemplated, including continuous plug flow reactors, or agitated batch reactors. Water 7 may also be added to third mixture 21 in second digestion reactor 16 in a quantity necessary to produce a near-saturated solution, preferably achieved at approximately 40% dry solids or 42 degrees Baumé (°Bé).

During the initial start-up phase of second digestion reactor 16, pre-heated second mother liquor 93, used wash water 8, or used sulfuric acid leachate 9, are not yet available for possible addition to third mixture 21. However, after the initial start-up phase, pre-heated third mother liquor 93, used wash water 8, or used sulfuric acid leachate 9, may all collectively or separately be recycled for use in providing third mixture 21. In this embodiment of the invention, the primary source of used sulfuric acid leachate 9 during continuous operation is used sulfuric acid leachate 711 (See FIG. 7), but other sources of used sulfuric acid leachate are contemplated. In this embodiment of the invention, the primary sources of used wash water 8 during continuous operation include used wash water 40, used wash water 561 (See FIG. 5), and used wash water 679 (See FIG. 6), but other sources of used wash water are also contemplated. Also, in an alternate embodiment of the invention, sulfuric acid may be replaced or supplemented by other vigorous acids, such as hydrochloric acid.

Substantially all of the metal oxides, which are predominately iron oxides, remaining in first solid phase 35 are leached into solution by transformation into metal sulfates in third mixture 21 in second digestion reactor 16. The digestion process in second digestion reactor 16 is a complete digestion process, with all metal species remaining in first solid phase 35 leached into solution by sulfuric acid well in excess of stoichiometric amounts. Because the digestion process in second digestion reactor 16 is intended to be a complete digestion process, the pH level in second digestion reactor 16 is maintained at below pH 1.0.

Although significant heat is evolved from the addition of sulfuric acid 6 (preferably commercial grade, approximately 93% $H_2SO_4$), and used sulfuric acid leachate 9, to third mixture 21, additional heat is added to second digestion reactor 16 by a heat source 18. Heat source 18 is external to second digestion reactor 16 to minimize fouling. The purpose of the heat source 18 is to maintain the third mixture 21 at approximately 1800° F. to 2000° F. (82° C. to 93° C.), for a period ranging from 1 to 6 hours, but preferably approximately 6 hours. This variable time period is necessary to accomplish the complete conversion of ferrites in first solid phase 35. The amount of time required depends upon the quantity of ferrites present in first solid phase 35.

Because this is a continuous process, adjustments to the activity in second digestion reactor 16 are made based upon observations of third mixture 21 solids, also referred to as third solid phase 36, by second analyzing device 37. The partial digestion process in second digestion reactor 16 is considered complete when data from second composition analyzing device 37 shows that the iron composition by weight in third solid phase 36 falls below approximately 5% or approximately 2%, depending upon the desired final lead product. If the final lead product will be lead sulfate, the iron concentration only needs to be reduced to approximately 5%, or less, because the sulfuric acid 703 used to transform the lead carbonate to lead sulphate (See FIG. 7) leaches out substantially all of the remaining iron into the sulfuric acid leachate 711 (which is then the source for either used sulfuric acid leachate 9). If the final lead product will be lead carbonate, the iron concentration must be reduced to below approximately 2%, to avoid excess dilution and iron contamination of the final lead carbonate product. In a preferred embodiment of the invention, second composition analyzing device 37 is a mass spectrometer, or spectrophotometer, but use of other composition analyzing devices are contemplated.

Upon completion of the digestion process in second digestion reactor 16, a third liquid phase 31 and a third solid phase 36 are separated from third mixture 21 by fourth separation device 26. In a preferred embodiment of the invention fourth separation device 26 is a gravity settler, centrifugal, or a continuous drum filter, although the use of other separating devices is contemplated.

Third solid phase 36 may be introduced into wash 42 and washed with water 39, resulting in washed filter cake 45 and used wash water 40. Washed filter cake 45 contains substantially all the calcium, lead, some remaining iron compounds and any dirt (including insoluble silicon oxides) originally present in raw material 10. Washed filter cake 45 is further processed, as will be described in the discussion of FIGS. 1A, 1B, 5 and 6.

Third liquid phase 31 emanating from fourth separation device 26 is combined with a second reducing agent 51 to form a fourth mixture 61 in a second reduction reactor 56. Second reduction reactor 56 is substantially similar to first reduction reactor 55 in structure and function.

Second reducing agent 51, preferably zinc metal or iron metal, reduces the iron in fourth mixture 61 from ferric to the ferrous, or +2 valence state. Second reducing agent 51 also reacts with any remaining cadmium and chromium, converting them to base metal, or the 0 (zero) valence state. In this embodiment, fourth mixture 61 is considered acceptable for further processing when the cadmium concentration is determined to be less than 100 ppm cadmium, as measured with a spectrophotometer or other composition analyzing device (not shown).

In an alternate embodiment of the invention, excess metallic iron second reducing agent 51 may be added to second reduction reactor 56, along with the corresponding stoichiometric quantity of sulfuric acid (not shown), to increase the iron sulfate content in the resulting fourth mixture 61.

Upon completion of the reduction process in second reactor 56, a fourth liquid phase 76 and a fourth solid phase 71 are separated from fourth mixture 61 by fifth separation device 66. In this embodiment of the invention, fifth separation device 66 is a continuous drum filter, although the use of other separating devices is contemplated.

Fourth solid phase 71 includes the bulk of the remaining metallic cadmium and metallic chromium. While fourth solid phase 71 contains the bulk of the cadmium and chromium which remained in first solid phase 35, fourth liquid phase 76 may still contain small quantities of lead, cadmium and chromium. Accordingly, these remaining impurities are separated from fourth liquid phase 76. In a preferred embodiment of the invention, the separation of these impurities from fourth liquid phase 76 is accomplished through a purification process, although other separation processes are contemplated. One type of purification process to separate impurities from fourth liquid phase 76 which has been used successfully is fractional crystallization.

In this embodiment of the fractional crystallization purification process, the fourth liquid phase 76 is first pre-cooled in a second heat exchanger 78, yielding pre-cooled fourth liquid phase 80. Recycled second mother liquor 91 from separation device 88 is also pre-heated in second heat exchanger 78 prior to being recycled as preheated second mother liquor 93 for use in providing third mixture 21 in second digestion reactor 16. The pre-cooled fourth liquid phase 80 is introduced into a second crystallizer 82 and recirculated between the second refrigerated crystallizer cooler 84 and the second crystallizer 82 until crystals begin to form at approximately 20° F. to 70° F. (–6° C. to 21° C.). When the crystallization process is completed, a second slurry 86 is formed, comprised of suspended bionutrient crystals and a mother liquor. The suspended bionutrient crystals formed in second crystallizer 82 are substantially purer than the second mother liquor in which they are suspended, and are comprised primarily of iron sulfate hydrate crystals with a relatively small amount of zinc sulfate hydrate crystals. Once separated from the mother liquor, these bionutrient crystals are a completed bionutrient crystal product.

In an alternate embodiment of the invention (not shown), fourth liquid phase 76 is directly introduced into second crystallizer 82, with no precooling or heat exchange.

Upon completion of the crystallization process in second crystallizer 82, a second mother liquor 91 and a second bionutrient crystal product 96 are separated from second slurry 86 by sixth separation device 88. In a preferred embodiment of the invention, sixth separation device 88 is a centrifugal filter, or a continuous drum filter, although the use of other separating devices is contemplated. However, because of the high density differential between the suspended bionutrient crystals and mother liquor in second slurry 86, a mere strainer or screen could also be effectively used as sixth separation device 88.

Second mother liquor 91 is used to pre-cool fourth liquid phase 76 in second heat exchanger 78. This process also results in recycled second mother liquor 91 being pre-heated in second heat exchanger 78 prior to being recycled as preheated second mother liquor 93 for use in providing third mixture 21 in second digestion reactor 16. In an alternate embodiment of the invention (not shown), second mother liquor 91 is recycled directly for use in providing third mixture 21 in second digestion reactor 16.

Following filtration by sixth separation device 88, second bionutrient crystal product 96 is analyzed by third composition analyzing device 63 to determine the relative iron and zinc concentrations in second bionutrient crystal product 96. Data from third composition analyzing device 63 is used to determine the selectively variable amount of the second bionutrient solution 100 which is combined with first bionutrient solution 99 to form third bionutrient solution 109. In a preferred embodiment of the invention, third composition analyzing device 63 is a mass spectrometer or spectrophotometer, although the use of other composition analyzing devices is contemplated.

Second bionutrient crystal product 96, preferably in the form of heptahydrate crystals, is re-solvated as necessary in water 98 or recycled used wash water 67, either in combination or separately, to form a second bionutrient solution 100 which is approximately 60% water by weight. Second bionutrient solution 100 is a solution of relatively high iron concentration and relatively low zinc concentration.

Second bionutrient solution 100 can be stored in storage container 102 for commercial sale or use as an iron rich solvated bionutrient product (not shown), for storage prior to transfer directly to granulation facility 800 (transfer path not shown), or for storage prior to transfer to combined storage container 120.

Second bionutrient solution 100 and first bionutrient solution 99 can be combined in selected ratios by use of volumetric controls 106 and 105 respectively, based upon data from first composition analyzing device 62 and third composition analyzing device 63, in combined storage container 120 to form third bionutrient solution 109. Third bionutrient solution 109 contains zinc and iron in selectively variable concentrations.

The concentration of zinc and iron in first bionutrient solution 99, second bionutrient solution 100, and third bionutrient solution 109, are altered to accommodate customers' particular needs, or the needs of the particular plant or animal with which the resulting bionutrient product will be used as a fertilizer or dietary supplement. Third bionutrient solution 109 can be stored for commercial sale or use as a solvated bionutrient product with a selectively variable concentration of zinc and iron, or it can be stored for transfer to a granulation facility 800 for sale as a granulated bionutrient product 450 with a selectively variable concentration of zinc and iron.

DESCRIPTION OF FIG. 2

Figure 2:
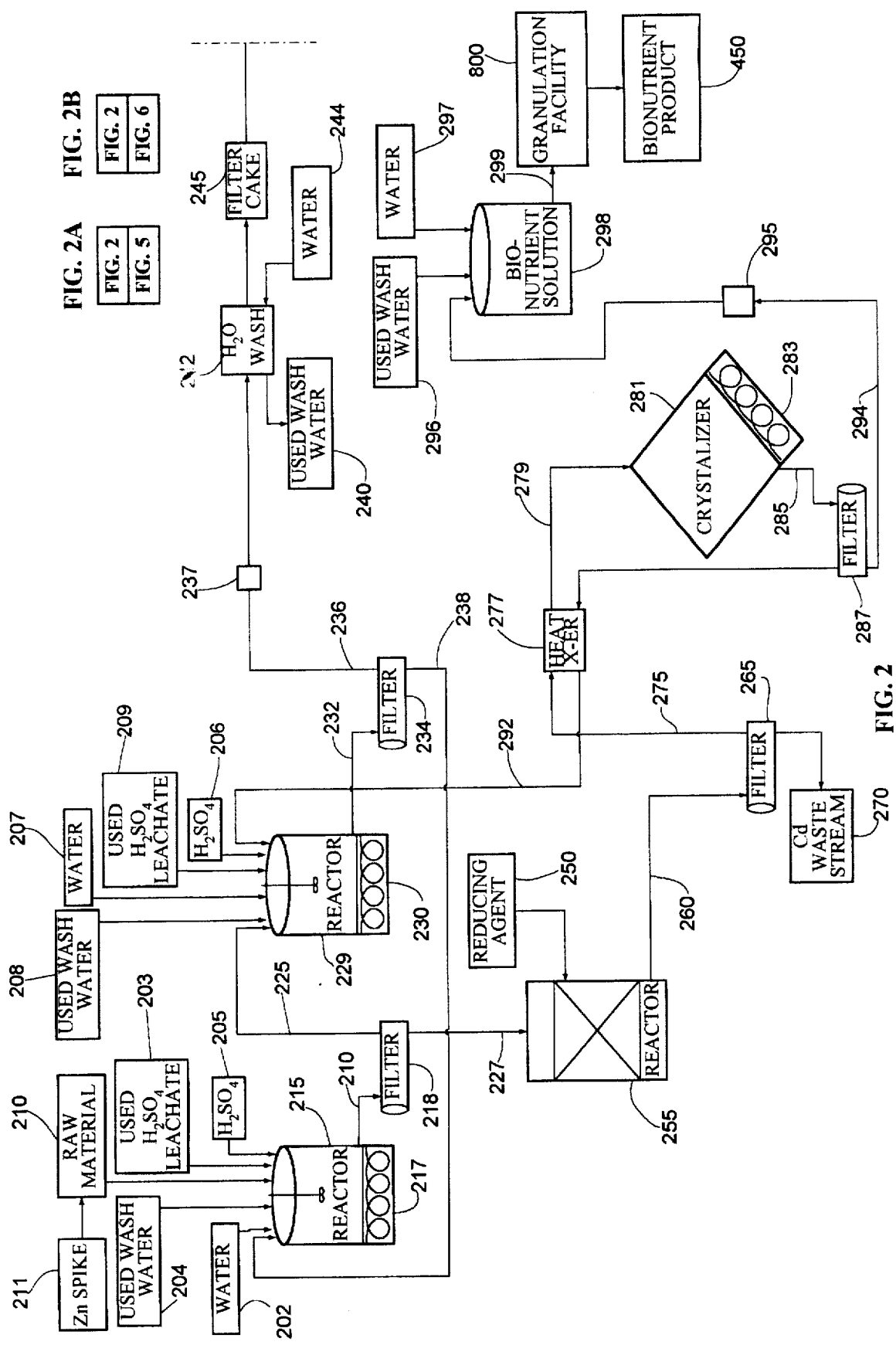
FIG. 2 A notated schematic flow diagram of an alternate embodiment of a two digestion reactor method and apparatus yielding bionutrient products, cadmium, and a filter cake.

A notated schematic flow diagram of an alternate embodiment of this invention is shown in FIG. 2. In this embodiment of the invention, concentrated sulfuric acid 205 is combined in excess of stoichiometric ratios with a raw material 201 to form a first mixture 210 in first digestion reactor 215 for metal solubilization. First digestion reactor 215 is preferably a continuous back-mix reactor, although a variety of other reactor types are also contemplated, including continuous plug flow reactors and agitated batch reactors. Water 202 may also be added to first mixture 210 in first digestion reactor 215 in a quantity necessary to produce a near-saturated solution, preferably achieved at approximately 40% dry solids or approximately 42 degrees Baumé (°Bé).

During the initial process start-up phase of this process and apparatus recycled used wash water 204, recycled used sulfuric acid leachate 203, recycled preheated mother liquor 292, and recycled second liquid phase 238, are not yet available for possible addition to first mixture 210. However, after the initial startup phase, recycled wash water 204, recycled used sulfuric acid leachate 203, recycled pre-heated mother liquor 292, and recycled second liquid phase 238, may all collectively or separately be recycled for use in providing first mixture 210. In this embodiment of the invention, the primary sources of used wash water 204 during continuous operation include used wash water 240, used wash water 561 (See FIG. 5), and used wash water 679 (See FIG. 6), but other sources of used wash water are also contemplated. In this embodiment of the invention, the primary source of used sulfuric acid leachate 203 during continuous operation is used sulfuric acid leachate 711 (See FIG. 7), but other sources of used sulfuric acid leachate are contemplated.

As first digestion reactor 215 and second digestion reactor 229 are intended to function as counter current cascading reactors, during operation of the two digestion reactors second liquid phase 238 is continuously recycled back into first mixture 210 in first digestion reactor 215.

While sulfuric acid 205, and used sulfuric acid leachate 203, are used in first mixture 210 to create the resultant sulfate products which are desired as bionutrients, in an alternate embodiment of the invention, sulfuric acid may be replaced or supplemented by other vigorous acids, such as hydrochloric acid.

Raw material 201 may be combined with a supplemental material 211, which is high in zinc or high in iron, as desired, to increase the zinc content or increase the iron content in the resultant bionutrient crystal product 294 or bionutrient solution 299. This supplemental material 211 may be EAF dust, brass mill dust, galvanizer's dross, copper smelter flue dust or any suitable raw material high in the desired component and correspondingly low in impurities.

Most metal oxides present in raw material 201 are leached into solution by transformation into metal sulfates in first mixture 210 in first digestion reactor 215. Even with the heat evolved from the addition of sulfuric acid 205 (preferably commercial grade, approximately 93% $H_2SO_4$), and used sulfuric acid leachate 203, to first mixture 210, additional heat is added to first digestion reactor 215 by a first heat source 217. First heat source 217 is external to first digestion reactor 215 to minimize fouling. The purpose of first heat source 217 is to maintain the first mixture 210 at approximately 180° F. to 200° F. (82° C. to 93° C.), for a period ranging from 1 to 6 hours, but preferably approximately 3 hours. This variable time period is necessary to facilitate the reluctant conversion of ferrites in raw material 201. The amount of time required depends upon the quantity of ferrites present in raw material 201. The digestion process in first digestion reactor 215 is considered complete when the iron composition by weight in first solid phase 225 falls below approximately 10% as measured by a mass spectrometer, or spectrophotometer, or other composition analyzing device (not shown).

Upon completion of the digestion process in first digestion reactor 215, a first liquid phase 227 and a first solid phase 225 are separated from first mixture 210 by first separation device 218. In this embodiment of the invention first separation device 218 can be a gravity settler, centrifugal filter, or continuous filter drum, although the use of other separating devices is contemplated.

First liquid phase 227 is further processed, as will be discussed after a complete description of how first solid phase 225 is processed.

First solid phase 225 is then combined in second digestion reactor 229 with concentrated sulfuric acid 206, in excess of stoichiometric ratios, to form second mixture 232 for additional metal solubilization. Second digestion reactor 229 is preferably a continuous back-mix reactor, although a variety of other reactor types are also contemplated, including continuous plug flow reactors, and agitated batch reactors. Water 207 may also be added to second mixture 232 in second digestion reactor 229 in a quantity necessary to produce a near-saturated solution, preferably achieved at approximately 40% dry solids or approximately 42 degrees Baumé(°Bé).

During the initial process start-up phase of this process and apparatus, recycled used wash water 208, and recycled used sulfuric acid leachate 209 are not yet available for possible addition to second mixture 232. However, after the initial start-up phase recycled wash water 208, and recycled used sulfuric acid leachate 209, may all collectively or separately be recycled for use in providing second mixture 232. In this embodiment of the invention, the primary sources of used wash water 208 during continuous operation include used wash water 240, used wash water 561 (See FIG. 5), and used wash water 679 (See FIG. 6), but other sources of used wash water are also contemplated. In this embodiment of the invention, the primary source of used sulfuric acid leachate 209 during continuous operation is used sulfuric acid leachate 711 (See FIG. 7), but other sources of used sulfuric acid leachate are contemplated.

Most of the remaining metal oxides present in first solid phase 225 are leached into solution by transformation into metal sulfates in second mixture 232. Even with the heat evolved from the addition of sulfuric acid 206 (preferably commercial grade, approximately 93% $H_2SO_4$), and used sulfuric acid leachate 209, to second mixture 232, additional heat is added to second digestion reactor 229 by a second heat source 230. Second heat source 230 is external to second digestion reactor 229 to minimize fouling. The purpose of second heat source 230 is to maintain second mixture 232 at approximately 180° F. to 200° F. (82° C. to 93° C.), for a period ranging from 3 to 6 hours, but preferably approximately 6 hours. This variable time period is necessary to complete the reluctant conversion of ferrites in first solid phase 225. The amount of time required depends upon the quantity of ferrites remaining in first solid phase 225. The digestion process in second digestion reactor 229 is considered complete when the iron composition by weight in second mixture 232 solids falls below approximately 5%, or approximately 2%, as measured by first composition analyzing device 237. If the final lead product will be lead sulfate, the iron concentration only needs to be reduced to approximately 5% or less because the sulfuric acid wash used to transform the lead carbonate to lead sulphate (See FIG. 7) leaches out most of the remaining iron into the sulfuric acid leachate (which is then the source for either recycled used sulfuric acid leachate 203 or 209). If the final lead product will be lead carbonate, the iron concentration must be reduced to below approximately 2%. In this embodiment of the invention, first composition analyzing device 237 is a mass spectrometer, or spectrophotometer, but use of other analyzing device is contemplated.

Upon completion of the digestion process in second digestion reactor 229, a second liquid phase 238 and a second solid phase 236 are separated from second mixture 232 by second separation device 234. In this embodiment of the invention, second separation device 234 can be a gravity settler, or centrifugal filter, or continuous filter drum, although use of other separating devices is also contemplated.

The second solid phase 236 may be introduced into wash 242 and washed with water 244, resulting in washed filter cake 245 and used wash water 240. Washed filter cake 245 contains substantially all the calcium, lead, some iron compounds and any dirt (including insoluble silicon oxides) originally present in raw material 210. Washed filter cake 245 is then further processed as will be described in the discussion of FIGS. 2A, 2B, 5 and 6.

As mentioned above, first liquid phase 227 is further processed following its separation from first solid phase 311. First liquid phase 227, emanating from first separation device 218, is combined with a reducing agent 250 to form a third mixture 260 in a reduction reactor 255.

In addition to desirable bionutrients, first liquid phase 227 also contains undesirable constituents such as cadmium and chromium. Also, the iron initially present in third mixture 260 is in the ferric, or +3 valence state, which is not readily available for assimilation by biological organisms.

Reduction reactor 255 is preferably a tower which is packed with a reducing agent 250. This type of reactor is also referred to as a packed column reactor. Reducing agent 250, preferably zinc metal or iron metal, reduces the iron in second mixture 260 from ferric to the more soluble ferrous, or +2 valence state, which is available for assimilation by biological organisms. Reducing agent 250 also reacts with cadmium, copper and chromium, converting them to base metal, or the 0 (zero) valence state. In this embodiment, third mixture 260 is considered ready for further processing when the cadmium concentration is determined to be less than 100 ppm cadmium, as measured with a mass spectrometer, spectrophotometer or other analyzing device (not shown).

In an alternate embodiment of the invention, additional metallic zinc or metallic iron reducing agent 250 may be added to reduction reactor 255, along with the corresponding stoichiometric quantity of sulfuric acid, to selectively and variably increase the zinc sulfate or iron sulfate content in the resulting third mixture 260. Increasing the zinc content or iron content of third mixture 260 results in an increase in the zinc content or iron content of bionutrient crystal product 294, or bionutrient solution 299.

Upon completion of the reduction process in reduction reactor 255, a third liquid phase 275 and a third solid phase 270 are separated from third mixture 260 by third separation device 265. In a preferred embodiment of the invention, third separation device 265 is a duplex cartridge, semicontinuous filter, or continuous drum filter, although the use of other separating devices is contemplated.

Third solid phase 270 includes as a major component metallic cadmium, metallic copper, and metallic chromium, available for commercial use or sale. While third solid phase 270 contains the bulk of the cadmium, copper and chromium present in the original raw material 10, third liquid phase 275 still contains small quantities of lead, cadmium, copper and chromium.

Accordingly, these remaining impurities are separated from third liquid phase 275. In a preferred embodiment of the invention, the separation of these impurities from third liquid phase 275 is accomplished through a purification process, although other separation processes are contemplated. One type of purification process to separate impurities from third liquid phase 275 which has been used successfully is fractional crystallization.

In this embodiment of the fractional crystallization process, the third liquid phase 275 is first pre-cooled in a heat exchanger 277, yielding pre-cooled third liquid phase 379. Recycled mother liquor 290 from separation device 287 is also pre-heated in heat exchanger 277 prior to being recycled as preheated mother liquor 292 for use in providing first mixture 210 in first digestion reactor 215. Pre-cooled third liquid phase 279 is introduced into a crystallizer 281 and recirculated between the refrigerated crystallizer cooler 283 and the crystallizer 281 until crystals begin to form at approximately 20° F. to 70° F. (–6° C. to 21° C.). When the crystallization process is completed, a slurry 285 is formed, comprised of suspended bionutrient crystals and a mother liquor. The suspended bionutrient crystals formed in crystallizer 281 are substantially purer than the mother liquor in which they are suspended, and are comprised primarily of iron sulfate hydrate and zinc sulfate hydrate crystals. Once separated from the mother liquor, these bionutrient crystals are a completed bionutrient crystal product.

In an alternate embodiment of the invention (not shown), third liquid phase 275 is directly introduced into crystallizer 281, with no precooling or heat exchange, and a mother liquor 290 is then recycled directly for use in providing first mixture 210 in first digestion reactor 215.

Upon completion of the crystallization process in crystallizer 281, a mother liquor 290 and a bionutrient crystal product 294 are separated from slurry 285 by fourth separation device 287. In a preferred embodiment of the invention, separation device 287 is a centrifugal filter, or a continuous drum filter, although the use of other separating devices is contemplated. However, because of the high density differential between the suspended bionutrient crystals and mother liquor in slurry 285, a mere strainer or screen could also be effectively used as fourth separation device 287.

Following filtration by fourth separation device 287, bionutrient crystal product 294 is analyzed by second composition analyzing device 295 to determine the relative zinc and iron concentrations in bionutrient crystal product 294. In this embodiment of the invention, second composition analyzing device 295 is a mass spectrometer or spectrophotometer, although the use of other analyzing devices is contemplated.

Data from second composition analyzing device 295 is used to control the amount of supplemental material 211 (in the form of either a zinc spike or a iron spike) added to raw material 201 to form first mixture 210 in first digestion reactor 215, so that the desired relative concentration of zinc and iron in bionutrient crystal product 294 can be achieved. Data from second composition analyzing device 295 can also be used to control the selection of metallic zinc or iron as reducing agent 250, and whether or not an excess amount of the selected zinc or iron reducing agent 250 will be used, and whether or not additional sulfuric acid (not shown) should be added to third mixture 260 in reduction reactor 255, so that the desired relative concentration of zinc and iron in bionutrient crystal product 294 can be achieved.

Bionutrient crystal product 295, preferably in the form of heptahydrate crystals, is re-solvated as necessary in water 297, or used wash water 296, either in combination or separately, to form a bionutrient solution 299 which is approximately 60% water by weight.

Bionutrient solution 299 is a solution of selectively variable relative zinc and iron concentration. The concentration of zinc and iron in bionutrient solution 299 is altered to accommodate customers' particular needs, or the needs of the particular plant or animal with which the resulting bionutrient product will be used as a fertilizer or dietary supplement.

Bionutrient solution 299 can be stored in storage container 298 for commercial sale or use in its solvated form, or for storage prior to transfer to granulation facility 800.

DESCRIPTION OF FIG. 3

Figure 3:
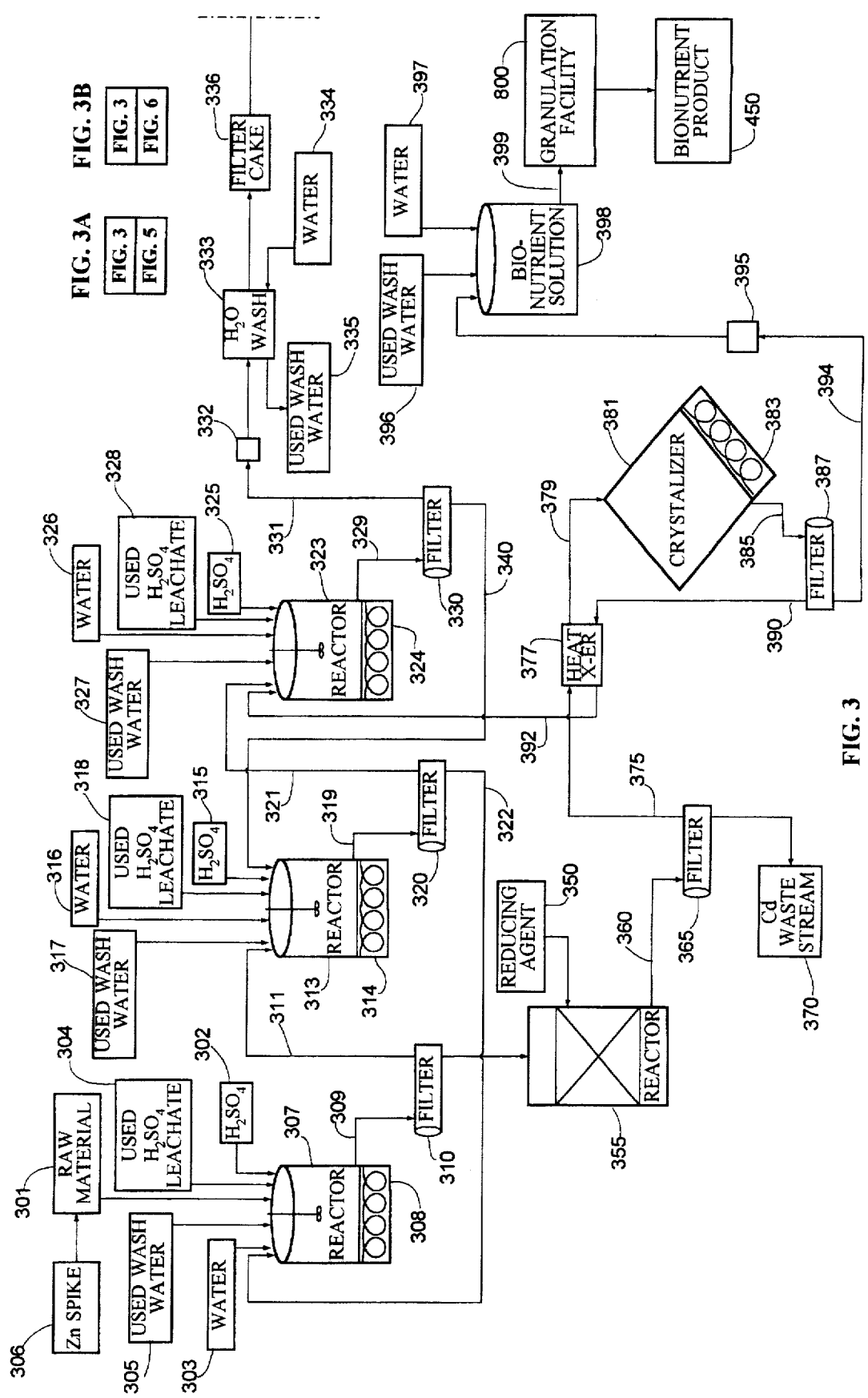
FIG. 3 A notated schematic flow diagram of a three digestion reactor method and apparatus yielding bionutrient products, cadmium, and a filter cake.

A notated schematic flow diagram of an alternate embodiment of the invention is shown in FIG. 3. In this embodiment, concentrated sulfuric acid 302 is combined in excess of stoichiometric ratios with a raw material 301 to form a first mixture 309 in first digestion reactor 307 for metal solubilization. First digestion reactor 307 is preferably a continuous back-mix reactor, although a variety of other reactor types are also contemplated, including continuous plug flow reactors, and agitated batch reactors. Water 303 may also be added to first mixture 309 in first digestion reactor 307 in a quantity necessary to produce a near-saturated solution, preferably achieved at approximately 40% dry solids or approximately 42 degrees Baumé (°Bé).

During the initial process start-up phase of this process and apparatus recycled used wash water 305, recycled used sulfuric acid leachate 304, pre-heated mother liquor 392, and recycled second liquid phase 322, are not yet available for possible addition to first mixture 309. However, after the initial start-up phase recycled used wash water 305, recycled used sulfuric acid leachate 304, pre-heated mother liquor 392, and recycled second liquid phase 322, may all collectively or separately be recycled for use in providing first mixture 309. In this embodiment of the invention, the primary sources of used wash water 305 during continuous operation include used wash water 335, used wash water 561 (See FIG. 5), and used wash water 679 (See FIG. 6), but other sources of used wash water are also contemplated. In this embodiment of the invention, the primary source of used sulfuric acid leachate 304 during continuous operation is used sulfuric acid leachate 711 (See FIG. 7), but other sources of used sulfuric acid leachate are contemplated.

As first digestion reactor 307, second digestion reactor 313, and third digestion reactor 323 are intended to function as counter current cascading reactors, during operation of the three digestion reactors second liquid phase 322 is continuously recycled back into first mixture 309 in first digestion reactor 307, and third liquid phase 340 is continuously recycled back into second mixture 319 in second digestion reactor 313.

While sulfuric acid 302, and use sulfuric acid leachate 304, are used in first mixture 309 to create the resultant sulfate products which are desired as bionutrients, in an alternate embodiment of the invention, sulfuric acid may be replaced or supplemented by other vigorous acids, such as hydrochloric acid.

Raw material 301 may be combined with supplemental material 306, which is high in zinc or high in iron, as desired, to increase the zinc content or increase the iron content in the resultant bionutrient crystal product 394 or bionutrient solution 399. This supplemental material 306 may be EAF dust, brass mill dust, galvanizer's dross, copper smelter flue dust or any suitable raw material high in the desired component and correspondingly low in impurities.

Most metal oxides present in raw material 301 are leached into solution by transformation into metal sulfates in first mixture 309 in first digestion reactor 307. Even with the heat evolved from the addition of sulfuric acid 302 (preferably commercial grade, approximately 93% $H_2SO_4$), and used sulfuric acid leachate 304, to first mixture 309, additional heat is added to first digestion reactor 307 by a first heat source 308. First heat source 308 is external to first digestion reactor 307 to minimize fouling. The purpose of first heat source 308 is to maintain the first mixture 309 at approximately 180° F. to 200° F. (82° C. to 93° C.), for a period ranging from 1 to 6 hours, but preferably approximately 2 hours. This variable time period is necessary to facilitate the reluctant conversion of ferrites in raw material 301. The amount of time required depends upon the quantity of ferrites present in raw material 301. The digestion process in first digestion reactor 307 is considered complete when the iron composition by weight in first solid phase 311 falls below approximately 10% as measured by a mass spectrometer, or spectrophotometer, or other analyzing device (not shown). Upon completion of the digestion process in first digestion reactor 307, a first liquid phase 312 and a first solid phase 311 are separated from first mixture 309 by first separation device 310. In a preferred embodiment of the invention first separation device 310 can be a gravity settler, or centrifugal filter, or continuous filter drum, although the use of other separating devices is contemplated.

First liquid phase 312 is further processed, as will be discussed after a complete description of how first solid phase 311 is processed.

First solid phase 311 is then combined in second digestion reactor 313 with concentrated sulfuric acid 315, in excess of stoichiometric ratios, to form second mixture 319 for additional metal solubilization. Second digestion reactor 313 is preferably a continuous back-mix reactor, although a variety of other reactor types are also contemplated, including continuous plug flow reactors, and agitated batch reactors. Water 316 may also be added to second mixture 319 in second digestion reactor 313 in a quantity necessary to produce a near-saturated solution, preferably achieved at approximately 40% dry solids or approximately 42 degrees Baumé (°Bé).

During the initial process start-up phase of this process and apparatus, recycled third liquid phase 340, recycled used wash water 317, and recycled used sulfuric acid leachate 318 are not yet available for possible addition to second mixture 319. However, after the initial start-up phase, recycled third liquid phase 340, recycled used wash water 317, and recycled used sulfuric acid leachate 318 may all collectively or separately be recycled for use in providing second mixture 319. In this embodiment of the invention, the primary sources of used wash water 317 during continuous operation include used wash water 335, used wash water 561 (See FIG. 5), and used wash water 679 (See FIG. 6), but other sources of used wash water are also contemplated. In this embodiment of the invention, the primary source of used sulfuric acid leachate 318 during continuous operation is used sulfuric acid leachate 711 (See FIG. 7), but other sources of used sulfuric acid leachate are contemplated.

Most of the remaining metal oxides present in first solid phase 311 are leached into solution by transformation into metal sulfates in second mixture 319. Even with the heat evolved from the addition of sulfuric acid 315 (preferably commercial grade, approximately 93% $H_2SO_4$) to second mixture 319, additional heat is added to second digestion reactor 313 by a second heat source 314. Second heat source 314 is external to second digestion reactor 314 to minimize fouling. The purpose of the second heat source 314 is to maintain the second mixture 319 at approximately 180° F. to 200° F. (82° C. to 93° C.), for a period ranging from 3 to 6 hours, but preferably approximately 4 hours. This variable time period is necessary to facilitate the reluctant conversion of ferrites in first solid phase 311. The amount of time required depends upon the quantity of ferrites remaining in first solid phase 311. The digestion process in second digestion reactor 313 is considered complete when the iron composition by weight in second mixture 319 solids falls below approximately 7% as measured by a mass spectrometer, or spectrophotometer, or other analyzing device (not shown).

Upon completion of the digestion process in second digestion reactor 313, a second liquid phase 322 and a second solid phase 321 are separated from second mixture 319 by second separation device 320. In a preferred embodiment of the invention second separation device 320 can be a gravity settler, or centrifugal filter, or continuous filter drum, although use of other separating devices is also contemplated. Second liquid phase 322 is recycled back to first digestion reactor 307 for use in providing first mixture 309.

Second solid phase 321 is then combined in third digestion reactor 323 with concentrated sulfuric acid 325, in excess of stoichiometric ratios, to form third mixture 329 for additional metal solubilization. Third digestion reactor 323 is preferably a continuous back-mix reactor, although a variety of other reactor types is also contemplated, including continuous plug flow reactors, and agitated batch reactors. Water 326 may also be added to third mixture 329 in third digestion reactor 323 in a quantity necessary to produce a near-saturated solution, preferably achieved at approximately 40% dry solids or approximately 42 degrees Baumé (°Bé).

During the initial process start-up phase of this process and apparatus, recycled used wash water 327, and recycled used sulfuric acid leachate 328 are not yet available for possible addition to third mixture 329. However, after the initial start-up phase, recycled used wash water 327, and recycled used sulfuric acid leachate 328 may all collectively or separately be recycled for use in providing second mixture 329. In this embodiment of the invention, the primary sources of used wash water 327 during continuous operation include used wash water 335, used wash water 561 (See FIG. 5), and used wash water 679 (See FIG. 6), but other sources of used wash water are also contemplated. In this embodiment of the invention, the primary source of used sulfuric acid leachate 328 during continuous operation is used sulfuric acid leachate 711 (See FIG. 7), but other sources of used sulfuric acid leachate are contemplated.

Most of the remaining metal oxides present in second solid phase 321 are leached into solution by transformation into metal sulfates in third mixture 329. Even with the heat evolved from the addition of sulfuric acid 325 (preferably commercial grade, approximately 93% $H_2SO_4$), and used sulfuric acid leachate 328, to third mixture 329, additional heat is added to third digestion reactor 323 by a third heat source 324. Third heat source 324 is external to third digestion reactor 324 to minimize fouling. The purpose of third heat source 314 is to maintain the third mixture 329 at approximately 180° F. to 200° F. (82° C. to 93° C.), for a period ranging from 3 to 6 hours, but preferably approximately 6 hours. This variable time period is necessary to facilitate the reluctant conversion of the ferrites in second solid phase 321. The amount of time required depends upon the quantity of ferrites remaining in second solid phase 321. The digestion process in third digestion reactor 323 is considered complete when the iron composition by weight in third mixture 329 solids falls below approximately 5%, or approximately 2%, as measured by first composition analyzing device 332. If the final lead product will be lead sulfate, the iron concentration only needs to be reduced to approximately 5% or less because the sulfuric acid wash used to transform the lead carbonate to lead sulphate (See FIG. 7) leaches out most of the remaining iron into the sulfuric acid leachate (which is then the source for either recycled used sulfuric acid leachate 304, 318, or 328). If the final lead product will be lead carbonate, the iron concentration must be reduced to below approximately 2%. In this embodiment of the invention, analyzing device 332 is a mass spectrometer, or spectrophotometer, but use of other analyzing device is contemplated.

Upon completion of the digestion process in third digestion reactor 323, a third liquid phase 340 and a third solid phase 331 are separated from third mixture 329 by third separation device 330. In a preferred embodiment of the invention third separation device 330 can be a gravity settler, or centrifugal filter, or continuous filter drum, although use of other separating devices is also contemplated.

The third solid phase 331, may be introduced into wash 333 and washed with water 334, resulting in washed filter cake 336 and used wash water 335. Washed filter cake 336 contains substantially all the calcium, lead, some iron compounds and any dirt (including insoluble silicon oxides) originally present in raw material 301. Washed filter cake 336 is then further processed, as will be described in the discussion of FIGS. 3A, 3B, 5 and 6.

As mentioned above, first liquid phase 312 is further processed following its separation from first solid phase 311. First liquid phase 312, emanating from filter 310, is combined with a reducing agent 350 to form a fourth mixture 360 in a reduction reactor 355.

In addition to desirable bionutrients, first liquid phase 312 also contains undesirable constituents such as cadmium and chromium. Also, the iron initially present in fourth mixture 360 is in the ferric, or +3 valence state, which is not readily available for assimilation by biological organisms.

Reduction reactor 355 is preferably a tower which is packed with a reducing agent 350. This type of reactor is also referred to as a packed column reactor. Reducing agent 350, preferably zinc metal or iron metal, reduces the iron in fourth mixture 360 from ferric to the more soluble ferrous, or +2 valence state, which is available for assimilation by biological organisms. Reducing agent 350 also reacts with cadmium, copper and chromium, converting them to base metal, or the 0 (zero) valence state. In this embodiment, fourth mixture 360 is considered ready for further processing when the cadmium concentration is determined to be less than 100 ppm cadmium, as measured with a mass spectrometer, spectrophotometer or other analyzing device (not shown).

In an alternative embodiment of the invention, additional metallic zinc or metallic iron reducing agent 350 may be added to reduction reactor 355, along with the corresponding stoichiometric quantity of sulfuric acid, to selectively and variably increase the zinc sulfate or iron sulfate content in the resulting fourth mixture 360. Increasing the zinc content or iron content of fourth mixture 360 results in an increase in the zinc content or iron content of bionutrient crystal product 394, or bionutrient solution 399.

Upon completion of the reduction process in reduction reactor 355, a fourth liquid phase 375 and a fourth solid phase 370 are separated from fourth mixture 360 by fourth separation device 365. In a preferred embodiment of the invention, fourth separation device 365 is a duplex cartridge, semicontinuous filter, or continuous drum filter, although the use of other separating devices is contemplated. Fourth solid phase 370 includes as a major component metallic cadmium, metallic copper, and metallic chromium, available for commercial use or sale. While fourth solid phase 370 contains the bulk of the cadmium, copper and chromium present in the original raw material 301, fourth liquid phase 375 still contains small quantities of lead, cadmium, copper and chromium.

Accordingly, these remaining impurities are separated from fourth liquid phase 375. In a preferred embodiment of the invention, the separation of these impurities from fourth liquid phase 375 is accomplished through a purification process, although other separation processes are contemplated. One type of purification process to separate impurities from fourth liquid phase 375 which has been used successfully is fractional crystallization.

In this embodiment of the fractional crystallization process, the fourth liquid phase 375 is first pre-cooled in a heat exchanger 377, in which recycled mother liquor 390 from separation device 387 is also pre-heated prior to being recycled as pre-heated mother liquor 392 for use in providing first mixture 392 in first digestion reactor 307. The pre-cooled fourth liquid phase 375 is introduced into a crystallizer 381 and recirculated between the refrigerated crystallizer cooler 383 and the crystallizer 381 until crystals begin to form at approximately 20° F. to 70° F. (−6° C. to 21° C.). When the crystallization process is completed, a slurry 385 is formed, comprised of suspended bionutrient crystals and a mother liquor. The suspended bionutrient crystals formed in crystallizer 381 are substantially purer than the mother liquor in which they are suspended, and are comprised primarily of iron sulfate hydrate and zinc sulfate hydrate crystals. Once separated from the mother liquor, these bionutrient crystals are a completed bionutrient crystal product.

In an alternate embodiment of the invention (not shown), fourth bionutrient solution 375 is directly introduced into crystallizer 381, with no precooling or heat exchange, and mother liquor 390 is then recycled directly for use in providing first mixture 309 in first digestion reactor 307.

Upon completion of the crystallization process in crystallizer 381, a mother liquor 390 and a bionutrient crystal product 394 are separated from slurry 385 by fifth separation device 387. In a preferred embodiment of the invention, fifth separation device 387 is a centrifugal filter, or a continuous drum filter, although the use of other separating devices is contemplated. However, because of the high density differential between the suspended bionutrient crystals and mother liquor in slurry 385, a mere strainer or screen could also be effectively used as fifth separation device 387.

Following filtration by fifth separation device 387, bionutrient crystal product 394 is analyzed by second composition analyzing device 395 to determine the relative zinc and iron concentrations in bionutrient crystal product 394. In this embodiment of the invention, second composition analyzing device 395 is a mass spectrometer or spectrophotometer, although the use of other analyzing devices is contemplated.

Data from second composition analyzing device 395 is used to control the amount of supplemental material 306 (in the form of a zinc spike or iron spike) added to raw material 301 to form first mixture 309 in first digestion reactor 307, so that the desired relative concentration of zinc and iron in bionutrient crystal product 394 can be achieved. Data from second composition analyzing device 395 can also be used to control the selection of metallic zinc or iron as reducing agent 350, and whether or not an excess amount of the selected zinc or iron reducing agent 350 will be used, and whether or not additional sulfuric acid (not shown) should be added to fourth mixture 360 in reduction reactor 355, so that the desired relative concentration of zinc and iron in crystallized bionutrient product 394 can be achieved.

Bionutrient crystals 394, preferably in the form of heptahydrate crystals, are re-solvated as necessary in water 397 or used wash water 396 (either separately or in combination) to form a sixth bionutrient solution 399 which is approximately 60% water by weight.

Bionutrient solution 399 is a solution of selectively variable relative zinc and iron concentration. The concentration of zinc and iron in bionutrient solution 399 is altered to accommodate customers' particular needs, or the needs of the particular plant or animal with which the resulting bionutrient product will be used as a fertilizer or dietary supplement.

Bionutrient solution 399 can be stored in storage container 398 for commercial sale or use in its solvated form, or for storage prior to transfer to granulation facility 800.

DESCRIPTION OF FIG. 4

Figure 4:
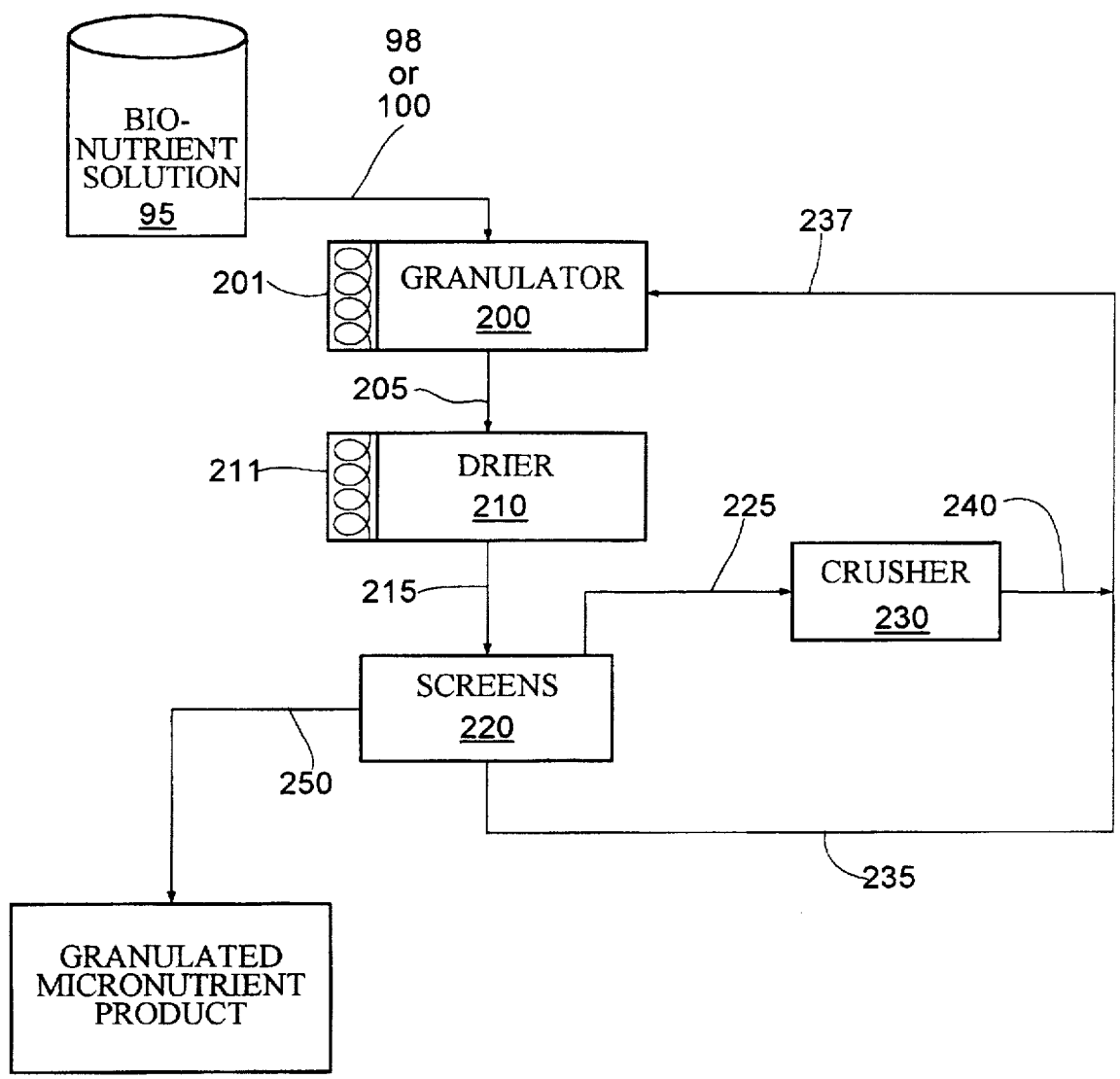
FIG. 4 A notated schematic flow diagram of a method and apparatus for granulation of a bionutrient product.

A notated schematic diagram of a preferred embodiment of granulation facility 800 is shown in FIG. 4. In alternate embodiment of the invention, the first bionutrient solution 99, the second bionutrient solution 100, or the third bionutrient solution 109, all as shown in FIG. 1; the bionutrient solution 299, as shown in FIG. 2; or the bionutrient solution 399, as shown in FIG. 3, can be used to form a granulated bionutrient product by use of a granulation facility 800, as shown in FIGS. 1, 2, and 3.

In FIG. 4, granulator bionutrient solution 401 can be comprised of bionutrient solutions 99, 100, 109 (see FIG. 1); bionutrient solution 299 (See FIG. 2); or bionutrient solution 399 (See FIG. 3), either separately or in selectively variable combinations to achieve a desired relative concentration of zinc and iron in the final granulated bionutrient product 450.

Granulator bionutrient solution 401 is sprayed into granulator 405 and onto a small amount of seed material 425. Seed material 425 is primarily comprised of undersized granules of zinc sulfate monohydrate and iron sulfate monohydrate. In a preferred embodiment of the invention, granulator 405 is a rotary drum equipped with a heated jacket 407, which maintains the drum temperature at approximately 200° F. (93° C.) in order to drive off at least approximately 20% to 30% of the water present in granulator bionutrient solution 401.

Inside granulator 405, the granulator bionutrient solution 401 dries and builds up on introduced seed granules 425, which then increase in size, forming granules 409. The newly formed granules 409 are further dried in an air drier 411, to form dried granules 415. In a preferred embodiment of the invention, air drier 411 is a rotary drum with a counter-current hot air feed 413. Formation of dried granules 415 is complete when their moisture content has been reduced to a total of approximately 5% to 10%.

Dried granules 415 are fed into screen 417. Screen 417 is a two step screen, where the granules are segregated by size. Undersized bionutrient granules 423, smaller than 12 mesh, as defined by the U.S. Sieve Series (1.68 mm sieve openings) and oversized granules 419, larger than 6 mesh, as defined by the U.S. Sieve Series (3.36 mm sieve openings) are each separated from the desired bionutrient granulated product 450. Oversized granules 419 are fed to a crusher 421, preferably a roll crusher, where the oversized granules 419 are pulverized and then mixed with undersized bionutrient granules 423 to form seed material 425 in granulator 405. The desired bionutrient granulated product 450 from screen 417 now ranges in size from approximately 6 to 12 mesh.

Separation and Recovery of Gypsum and Lead
From the Waste Stream Generated by the
Manufacture of Bionutrient Products

DESCRIPTION OF FIGS. 1A AND 5

Figure 5:
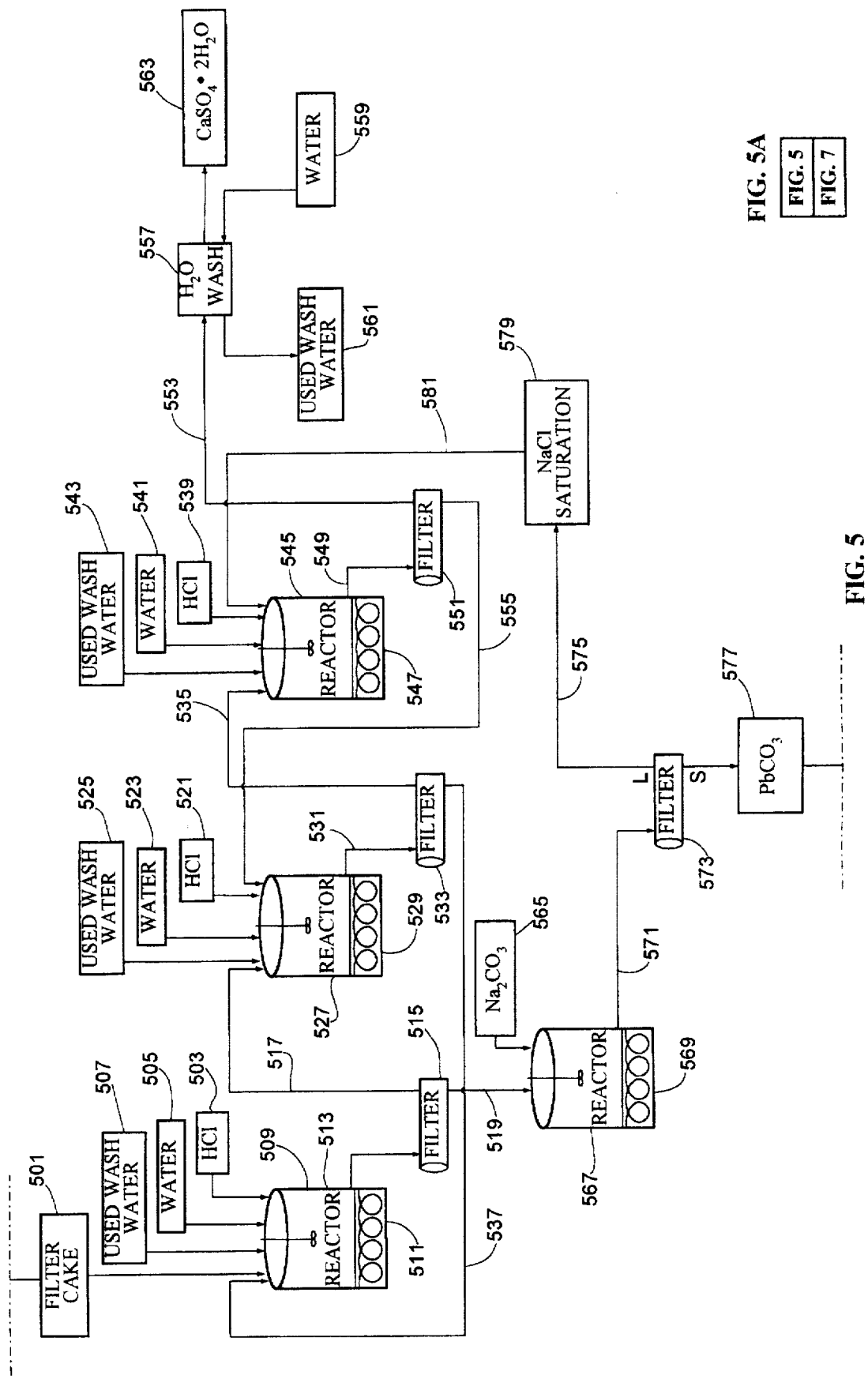
FIG. 5 A notated schematic flow diagram of a three digestion reactor filter cake digestion method and apparatus yielding gypsum, lead carbonate, and bionutrient products.

A notated schematic flow diagram of a preferred embodiment of the invention is shown in FIG. 1A. In FIG. 1A, the washed filter cake 45, resulting from the separation and recovery of zinc-iron bionutrient products as shown in FIG. 1, is further processed as shown in FIG. 5. In this embodiment of the invention, as continued from FIG. 1 to FIG. 5, the washed filter 45 of FIG. 1 is notated in FIG. 5 as washed filter cake 501.

During continuous operation of third digestion reactor 509, as shown in FIG. 5, washed filter cake 501 is combined with sixth liquid phase 537 to form fifth mixture 513. Third digestion reactor 509 is preferably a continuous back-mix reactor, although a variety of other reactor types are also contemplated, including continuous plug flow reactors, and agitated batch reactors.

During the initial start-up phase for third digestion reactor 509, recycled sixth liquid phase 537 and recycled used wash water 507 are not yet available for possible addition to fifth mixture 513. Accordingly, during the initial start-up phase for third digestion reactor 509, fifth mixture 513 is formed in two steps. In the first step, a saturated sodium chloride solution 504 is acidified by combining it with commercial grade (approximately 30% to 35%) hydrochloric acid 503, preferably in a ratio of 40:1 by weight, to form an acidified salt solution. In the second step, washed filter cake 501 is combined with the acidified salt solution, preferably in a ratio of approximately 1:25 by weight, to form fifth mixture 513.

After the initial start-up phase, recycled sixth liquid phase 537 and recycled used wash water 507 may be collectively or separately recycled for use in providing fifth mixture 513. In a preferred embodiment of the invention, the primary sources of used wash water 507 during continuous operation include used wash water 40 (See FIG. 1), and used wash water 561, but other sources of used wash water are also contemplated.

As third digestion reactor 509, fourth digestion reactor 527, and fifth digestion reactor 545 are intended to function as counter current cascading reactors, sixth liquid phase 537 is continuously recycled back into fifth mixture 513 in third digestion reactor 509, and seventh liquid phase 555 is continuously recycled back into sixth mixture 531 in fourth digestion reactor 527.

Fifth mixture 513 in third digestion reactor 509 is maintained at approximately 180° F. to 200° F. (82° C. to 93° C.) by heat source 511. Heat source 511 is preferably external to the reactor to minimize fouling. The lead and iron components in washed filter cake 501 are readily solvated as complex chlorides. Acid chloride digestion is considered complete when the lead content of the solids in fifth mixture 513 are less than 5000 ppm as determined by a mass spectrometer, or spectrophotometer or other analyzing device (not shown).

Upon completion of the acid chloride digestion process in third digestion reactor 509, a fifth liquid phase 519 and a fifth solid phase 517 are separated from fifth mixture 513 by seventh separation device 515. In this embodiment of the invention seventh separation device 515 is a gravity settler, or a continuous drum filter, although the use of other separating devices is contemplated.

Fifth liquid phase 519 is further processed following filtration by seventh separation device 515, as will be explained following the description of how fifth solid phase 517 is processed.

During continuous operation of fourth digestion reactor 527, fifth solid phase 517 is combined with seventh liquid phase 555 to form sixth mixture 531 in fourth digestion reactor 527. Fourth digestion reactor 527 is preferably a continuous backmix reactor, although a variety of other reactor types are also contemplated, including continuous plug flow reactors and agitated batch reactors.

During the initial start-up phase for fourth digestion reactor 527, recycled seventh liquid phase 555 and recycled used wash water 525 are not yet available for possible addition to sixth mixture 527. Accordingly, during the initial startup phase of fourth digestion reactor 527, sixth mixture 531 is formed in two steps. In the first step, a saturated sodium chloride solution 522 is acidified by combining it with commercial grade (approximately 30% to 35%) hydrochloric acid 521, preferably in a ratio of 40:1 by weight, to form an acidified salt solution. In the second step, fifth solid phase 517 is combined with the acidified salt solution, preferably in a ratio of approximately 1:25 by weight, to form sixth mixture 531.

After the initial start-up phase, recycled seventh liquid phase 555 and recycled used wash water 525 may be collectively or separately recycled for use in providing sixth mixture 531. In a preferred embodiment of the invention, the primary sources of used wash water 525 during continuous operation include used wash water 40 (See FIG. 1), and used wash water 561 but other sources of used wash water are also contemplated.

Sixth mixture 531 in fourth digestion reactor 527 is maintained at approximately 180° F. to 200° F. (82° C. to 93° C.) by heat source 529. Heat source 529 is preferably external to the reactor to minimize fouling. The lead and iron components in fifth solid phase 517 are readily solvated as complex chlorides. Acid chloride digestion is considered complete when the lead content of the solids in sixth mixture 531 are less than 1200 ppm as determined by a mass spectrometer, or spectrophotometer or other analyzing device (not shown).

Upon completion of the acid chloride digestion process in fourth digestion reactor 527, a sixth liquid phase 537 and a sixth solid phase 535 are separated from sixth mixture 531 by eighth separation device 533. In this embodiment of the invention, eighth separation device 533 is a gravity settler, or a continuous drum filter, although the use of other separating devices is contemplated.

Sixth solid phase 535 is combined with hydrochloric acid 539 and saturated sodium chloride solution 581 to form seventh mixture 549 in fifth digestion reactor 545. Fifth digestion reactor 545 is preferably a continuous back-mix reactor, although a variety of other reactor types are also contemplated, including continuous plug flow reactors, and agitated batch reactors.

Seventh mixture 549 is formed in two steps. In the first step, saturated sodium chloride solution 581 (initially formed by the addition of water 580 and sodium chloride 542, in excess of a soluble quantity, to brine pit 579) is acidified by combining it with commercial grade (approximately 30% to 35%) hydrochloric acid 539, preferably in a ratio of 40:1 by weight, to form an acidified salt solution. In the second step, sixth solid phase 535 is combined with the acidified salt solution, preferably in a ratio of approximately 1:25 by weight, to form seventh mixture 549. During continuous operation of fifth digestion reactor 545, recycled saturated sodium chloride eighth liquid phase 581 and recycled used wash water 543 may be collectively or separately recycled for use in providing seventh mixture 549. In a preferred embodiment of the invention, the primary sources of used wash water 543 during continuous operation include used wash water 40 (See FIG. 1), and used wash water 561, but other sources of used wash water are also contemplated.

Seventh mixture 549 in fifth digestion reactor 545 is maintained at approximately 180° F. to 200° F. (82° C. to 93° C.) by heat source 547. Heat source 547 is preferably external to the reactor to minimize fouling. The lead and iron components in seventh solid phase 535 are readily solvated as complex chlorides. Acid chloride digestion is considered complete when the lead content of the solids in seventh mixture 535 are less than 200 ppm as determined by a mass spectrometer, or spectrophotometer or other analyzing device (not shown).

Upon completion of the acid chloride digestion process in fifth digestion reactor 545, a seventh liquid phase 555 and a seventh solid phase 553 are separated from seventh mixture 549 by a ninth separation device 551. In this embodiment of the invention, ninth separation device 551 is a gravity settler, or a continuous drum filter, although the use of other separating devices is contemplated.

Seventh solid phase 553 includes as a major component calcium sulfate dihydrate ($CaSO_4 \cdot 2H_2O$), commonly referred to as gypsum. Seventh solid phase 553 may be fed into water wash 557 and washed with water 559, yielding washed gypsum 563, and used wash water 561.

Washed gypsum 563 is approximately 50 to 70% pure gypsum, with the remainder comprised primarily of silicon oxides, i.e. dirt. Washed gypsum 563 can be used as a soil additive. Washed gypsum 563 can also be dried in a dryer (not shown) and transferred to a storage container (not shown) for storage prior to sale or use.

As mentioned above, fifth liquid phase 519 is further processed following filtration by separation device 515.

The fifth liquid phase 519, also called acidic metal chlorides leachate 519, is combined with sodium carbonate 565 to provide a eighth mixture 571 in a neutralization reactor 567. Neutralization reactor 567 is preferably a continuous back-mix reactor, although a variety of other reactor types are also contemplated, including continuous plug flow reactors, and agitated batch reactors.

In eighth mixture 571, acidic metal chlorides leachate 519 is neutralized with sodium carbonate 565 for the purpose of precipitating lead carbonate from the acidic chlorides leachate 519. Lead carbonate will most effectively precipitate from eighth mixture 571 once a pH level of pH 7.0 has been met or exceeded.

Eighth mixture 571 in neutralization reactor 567 is maintained at approximately 60° F. to 100° F. (16° C. to 38° C.) by cooling source 569. Cooling source 569 is preferably external to the reactor to minimize fouling. The decrease in the temperature of eighth mixture 571 facilitates the precipitation of lead carbonate from eighth mixture 571. Precipitation additives, such as sodium chromate, a variety of water treatment chemicals, or other equivalent chemicals used to aid precipitation, may be used to complete the precipitation of lead from eighth mixture 571. The neutralization and precipitation process is considered complete when the lead content of the remaining liquids in eighth mixture 571 are less than 10 ppm as determined by a mass spectrometer, or spectrophotometer or other analyzing device (not shown).

Upon completion of the neutralization and precipitation process in neutralization reactor 567, a eighth liquid phase 575 and a eighth solid phase 577 are separated from eighth mixture 571 by tenth separation device 573. In this embodiment of the invention, tenth separation device 573 is either a filter press or drum type filter, although the use of other separating devices is contemplated.

Eighth solid phase 577 includes as a major component the carbonates of lead and iron, with a lead content of preferably 25% to 50%. Eighth solid phase 577 can be used for raw material in lead smelting, and for other commercial purposes.

Eighth liquid phase 575 is passed through a bed of sodium chloride 579, in the form of a brine pit, yielding a saturated sodium chloride eighth liquid phase 581. Saturated sodium chloride eighth liquid phase 581 may be recycled for use in seventh mixture 549 in fifth digestion reactor 545.

DESCRIPTION OF FIGS. 2A AND 5

A notated schematic flow diagram of a preferred embodiment of the invention is shown in FIG. 2A. In FIG. 2A, the washed filter cake 245, resulting from the separation and recovery of zinc-iron bionutrient products as shown in FIG. 2, is further processed as shown in FIG. 5. In a preferred embodiment of the invention, as continued from FIG. 2 to FIG. 5, the washed filter cake 245 of FIG. 2 is notated in FIG. 5 as washed filter cake 501.

During continuous operation of third digestion reactor 509, as shown in FIG. 5, washed filter cake 501 is combined with fifth liquid phase 537 to form fourth mixture 513. Third digestion reactor 509 is preferably a continuous back-mix reactor, although a variety of other reactor types are also contemplated, including continuous plug flow reactors, and agitated batch reactors.

During the initial start-up phase for third digestion reactor 509, recycled fifth liquid phase 537 and recycled used wash water 507 are not yet available for possible addition to fourth mixture 513. Accordingly, during the initial start-up phase for third digestion reactor 509, fourth mixture 513 is formed in two steps. In the first step, a saturated sodium chloride solution 504 is acidified by combining it with commercial grade (30–35%) hydrochloric acid 503, preferably in a ratio of 40:1 by weight, to form an acidified salt solution. In the second step, washed filter cake 501 is combined with the acidified salt solution, preferably in a ratio of approximately 1:25 by weight, to form fourth mixture 513.

After the initial start-up phase, recycled fifth liquid phase 537 and recycled used wash water 507 may be collectively or separately recycled for use in providing fourth mixture 513. In a preferred embodiment of the invention, the primary sources of used wash water 507 during continuous operation include used wash water 240 (See FIG. 2), and used wash water 561, but other sources of used wash water are also contemplated.

As third digestion reactor 509, fourth digestion reactor 527, and fifth digestion reactor 545 are intended to function as counter current cascading reactors, fifth liquid phase 537 is continuously recycled back into fourth mixture 513 in third digestion reactor 509, and sixth liquid phase 555 is continuously recycled back into fifth mixture 531 in fourth digestion reactor 527.

Fourth mixture 513 in third digestion reactor 509 is maintained at approximately 180° F. to 200° F. (82° C. to 93° C.) by heat source 511. Heat source 511 is preferably external to the reactor to minimize fouling. The lead and iron components in washed filter cake 501 are readily solvated as complex chlorides. Acid chloride digestion is considered complete when the lead content of the solids in fourth mixture 513 are less than 5000 ppm as determined by a mass spectrometer, or spectrophotometer or other analyzing device (not shown).

Upon completion of the acid chloride digestion process in third digestion reactor 509, a fourth liquid phase 519 and a fourth solid phase 517 are separated from fourth mixture 513 by fifth separation device 515. In this embodiment of the invention, fifth separation device 515 is a gravity settler, or a continuous drum filter, although the use of other separating devices is contemplated.

Fourth liquid phase 519 is further processed following filtration by fifth separation device 515, as will be explained following the description of how fourth solid phase 517 is processed.

During continuous operation of fourth digestion reactor 527, fourth solid phase 517 is combined with eight liquid phase 555 to form fifth mixture 531 in fourth digestion reactor. Fourth digestion reactor 527 is preferably a continuous back-mix reactor, although a variety of other reactor types are also contemplated, including continuous plug flow reactors, and agitated batch reactors.

During the initial start-up phase for fourth digestion reactor 527, recycled sixth liquid phase 555 and recycled used wash water 525 are not yet available for possible addition to fifth mixture 531. Accordingly, during the initial start-up phase of fourth digestion reactor 527, fifth mixture 531 is formed in two steps. In the first step, a saturated sodium chloride solution 522 is acidified by combining it with commercial grade (30–35%) hydrochloric acid 521, preferably in a ratio of 40:1 by weight, to form an acidified salt solution. In the second step, fourth solid phase 517 is combined with the acidified salt solution, preferably in a ratio of approximately 1:25 by weight, to form fifth mixture 531.

After the initial start-up phase, recycled sixth liquid phase 555 and recycled used wash water 525 may be collectively or separately recycled for use in providing fifth mixture 531. In a preferred embodiment of the invention, the primary sources of used wash water 525 during continuous operation include used wash water 240 (See FIG. 2), and used wash water 561, but other sources of used wash water are also contemplated.

Fifth mixture 531 in fourth digestion reactor 527 is maintained at approximately 180° F. to 200° F. (82° C. to 93° C.) by heat source 529. Heat source 529 is preferably external to the reactor to minimize fouling. The lead and iron components in fourth solid phase 517 are readily solvated as complex chlorides. Acid chloride digestion is considered complete when the lead content of the solids in fifth mixture 531 are less than 1200 ppm as determined by a mass spectrometer, or spectrophotometer or other analyzing device (not shown).

Upon completion of the acid chloride digestion process in fourth digestion reactor 527, an fifth liquid phase 537 and an fifth solid phase 535 are separated from fifth mixture 531 by sixth separation device 533. In this embodiment of the invention, sixth separation device 533 is a gravity settler, or a continuous drum filter, although the use of other separating devices is contemplated.

Fifth solid phase 535 is combined with hydrochloric acid 539 and saturated sodium chloride solution 581 to form sixth mixture 549 in fifth digestion reactor 545. Fifth digestion reactor 545 is preferably a continuous back-mix reactor, although a variety of other reactor types are also contemplated, including continuous plug flow reactors, and agitated batch reactors.

Sixth mixture 549 is formed in two steps. In the first step, a saturated sodium chloride solution 581 (initially formed by the addition of water 580 and sodium chloride 542, in excess of a soluble quantity, to brine pit 579) is acidified by combining it with commercial grade (30–35%) hydrochloric acid 539, preferably in a ratio of 40:1 by weight, to form an acidified salt solution. In the second step, fifth solid phase 535 is combined with the acidified salt solution, preferably in a ratio of approximately 1:25 by weight, to form sixth mixture 549. During continuous operation of fifth digestion reactor 545, recycled saturated sodium chloride seventh liquid phase 581 and recycled used wash water 543 may be collectively or separately recycled for use in providing sixth mixture 549. In a preferred embodiment of the invention, the primary sources of used wash water 543 during continuous operation include used wash water 240 (See FIG. 2), and used wash water 561, but other sources of used wash water are also contemplated.

Sixth mixture 549 in fifth digestion reactor 545 is maintained at approximately 180° F. to 200° F. (82° C. to 93° C.) by heat source 547. Heat source 547 is preferably external to the reactor to minimize fouling. The lead and iron components in sixth solid phase 535 are readily solvated as complex chlorides. Acid chloride digestion is considered complete when the lead content of the solids in sixth mixture 535 are less than 200 ppm as determined by a mass spectrometer, or spectrophotometer or other analyzing device (not shown).

Upon completion of the acid chloride digestion process in fifth digestion reactor 545, a sixth liquid phase 555 and a sixth solid phase 553 are separated from sixth mixture 549 by seventh separation device 551. In this embodiment of the invention, seventh separation device 551 is a gravity settler, or a continuous drum filter, although the use of other separating devices is contemplated.

Sixth solid phase 553 includes as a major component calcium sulfate dihydrate ($CaSO_4 \cdot 2H_2O$), commonly referred to as gypsum. Sixth solid phase 553 may be fed into water wash 557 and washed with water 559, yielding washed gypsum 563, and used wash water 561.

Washed gypsum 563 is approximately 50 to 70% pure gypsum, with the remainder comprised primarily of silicon oxides, i.e. dirt. Washed gypsum 563 can be used as a soil additive. Washed gypsum 563 can also be dried in a dryer (not shown) and transferred to a storage container (not shown) for storage prior to sale or use.

As mentioned above, fourth liquid phase 519 is further processed following filtration by fifth separation device 515. The fourth liquid phase 519, also called acidic metal chlorides leachate 519, is combined with sodium carbonate 565 to provide seventh mixture 571 in a neutralization reactor 567. Neutralization reactor 567 is preferably a continuous back-mix reactor, although a variety of other reactor types are also contemplated, including continuous plug flow reactors, and agitated batch reactors.

In seventh mixture 571, acidic metal chlorides leachate 519 is neutralized with sodium carbonate 565 for the purpose of precipitating lead carbonate from the acidic chlorides leachate 519. Lead carbonate will most effectively precipitate from tenth mixture 571 once a pH level of pH 7.0 has been met or exceeded.

Seventh mixture 571 in neutralization reactor 567 is maintained at approximately 60° F. to 100° F. (16° C. to 38° C.) by cooling source 569. Cooling source 569 is preferably external to the reactor to minimize fouling. The decrease in the temperature of seventh mixture 571 facilitates the precipitation of lead carbonate from seventh mixture 571. Precipitation additives, such as sodium chromate, a variety of water treatment chemicals, or other equivalent chemicals used to aid precipitation, may be used to complete the precipitation of lead from seventh mixture 571. The neutralization and precipitation process is considered complete when the lead content of the remaining liquids in seventh mixture 571 are less than 10 ppm as determined by a mass spectrometer, or spectrophotometer or other analyzing device (not shown).

Upon completion of the neutralization and precipitation process in neutralization reactor 567, a seventh liquid phase 575 and a seventh solid phase 577 are separated from seventh mixture 571 by eighth separation device 573. In this embodiment of the invention, eighth separation device 573 is a filter press or drum type filter, although the use of other separating devices is contemplated.

Seventh solid phase 577 includes as a major component the carbonates of lead and iron, with a lead content of preferably 25% to 50%. Seventh solid phase 577 can be used for raw material in lead smelting, and for other commercial purposes.

Seventh liquid phase 575 is passed through a bed of sodium chloride 579, in the form of a brine pit, yielding a saturated sodium chloride seventh liquid phase 581. Saturated sodium chloride seventh liquid phase 581 may be recycled for use in sixth mixture 549 in fifth digestion reactor 545.

DESCRIPTION OF FIGS. 3A AND 5

A notated schematic flow diagram of a preferred embodiment of the invention is shown in FIG. 3A. In FIG. 3A, the washed filter cake 336, resulting from the separation and recovery of zinc-iron bionutrient products as shown in FIG. 3, is further processed as shown in FIG. 5. In a preferred embodiment of the invention, as continued from FIG. 3 to FIG. 5, the washed filter cake 336 of FIG. 3 is notated in FIG. 5 as washed filter cake 501.

During continuous operation of fourth digestion reactor 509, as shown in FIG. 5, washed filter cake 501 is combined with sixth liquid phase 537 to form fifth mixture 513. Fourth digestion reactor 509 is preferably a continuous back-mix reactor, although a variety of other reactor types are also contemplated, including continuous plug flow reactors, and agitated batch reactors.

During the initial start-up phase for fourth digestion reactor 509, recycled sixth liquid phase 537 and recycled used wash water 507 are not yet available for possible addition to fifth mixture 513. Accordingly, during the initial start-up phase for fourth digestion reactor 509, fifth mixture 513 is formed in two steps. In the first step, a saturated sodium chloride solution 504 is acidified by combining it with commercial grade (30–35%) hydrochloric acid 503, preferably in a ratio of 40:1 by weight, to form an acidified salt solution. In the second step, washed filter cake 501 is combined the acidified salt solution, preferably in a ratio of approximately 1:25 by weight, to form fifth mixture 513.

After the initial start-up phase, recycled sixth liquid phase 537 and recycled used wash water 507 may be collectively or separately recycled for use in providing fifth mixture 513. In a preferred embodiment of the invention, the primary sources of used wash water 507 during continuous operation include used wash water 335 (See FIG. 3), and used wash water 561, but other sources of used wash water are also contemplated.

As fourth digestion reactor 509, fifth digestion reactor 527, and sixth digestion reactor 545 are intended to function as counter current cascading reactors, sixth liquid phase 537 is continuously recycled back into fifth mixture 513 in fourth digestion reactor 509, and seventh liquid phase 555 is continuously recycled back into sixth mixture 531 in fifth digestion reactor 527.

Fifth mixture 513 in fourth digestion reactor 509 is maintained at approximately 180° F. to 200° F. (82° C. to 93° C.) by heat source 511. Heat source 511 is preferably external to the reactor to minimize fouling. The lead and iron components in washed filter cake 501 are readily solvated as complex chlorides. Acid chloride digestion is considered complete when the lead content of the solids in fifth mixture 513 are less than 5000 ppm as determined by a mass spectrometer, or spectrophotometer or other analyzing device (not shown).

Upon completion of the acid chloride digestion process in fourth digestion reactor 509, a fifth liquid phase 519 and a fifth solid phase 517 are separated from fifth mixture 513 by sixth separation device 515. In this embodiment of the invention, sixth separation device 515 is a gravity settler, or a continuous drum filter, although the use of other separating devices is contemplated.

Fifth liquid phase 519 is further processed following filtration by sixth separation device 515, as will be explained following the description of how fifth solid phase 517 is processed.

During continuous operation of fifth digestion reactor 527, fifth solid phase 517 is combined with seventh liquid phase 555 to form sixth mixture 531 in fifth digestion reactor 527. Fifth digestion reactor 527 is preferably a continuous back-mix reactor, although a variety of other reactor types are also contemplated, including continuous plug flow reactors, and agitated batch reactors.

During the initial start-up phase for fifth digestion reactor 527, recycled seventh liquid phase 555 and recycled used wash water 525 are not yet available for possible addition to sixth mixture 527. Accordingly, during the initial start-up phase of fifth digestion reactor 527, sixth mixture 531 is formed in two steps. In the first step, a saturated sodium chloride solution 522 is acidified by combining it with commercial grade (30–35%) hydrochloric acid 521, preferably in a ratio of 40:1 by weight, to form an acidified salt solution. In the second step, fifth solid phase 517 is combined with the acidified salt solution, preferably in a ratio of approximately 1:25 by weight, to form sixth mixture 531.

After the initial start-up phase, recycled seventh liquid phase 555 and recycled used wash water 525 may be collectively or separately recycled for use in providing sixth mixture 531. In a preferred embodiment of the invention, the primary sources of used wash water 525 during continuous operation include used wash water 335 (See FIG. 3), and used wash water 561, but other sources of used wash water are also contemplated.

Sixth mixture 531 in fifth digestion reactor 527 is maintained at approximately 180° F. to 200° F. (82° C. to 93° C.) by heat source 529. Heat source 529 is preferably external to the reactor to minimize fouling. The lead and iron components in fifth solid phase 517 are readily solvated as complex chlorides. Acid chloride digestion is considered complete when the lead content of the solids in sixth mixture 531 are less than 1200 ppm as determined by a mass spectrometer, or spectrophotometer or other analyzing device (not shown).

Upon completion of the acid chloride digestion process in fifth digestion reactor 527, an sixth liquid phase 537 and an sixth solid phase 535 are separated from sixth mixture 531 by seventh separation device 533. In this embodiment of the invention, seventh separation device 533 is a gravity settler, or a continuous drum filter, although the use of other separating devices is contemplated.

Sixth solid phase 535 is combined with hydrochloric acid 539 and saturated sodium chloride solution 581 to form seventh mixture 549 in sixth digestion reactor 545. Sixth digestion reactor 545 is preferably a continuous back-mix reactor, although a variety of other reactor types are also contemplated, including continuous plug flow reactors, and agitated batch reactors.

Seventh mixture 549 is formed in two steps. In the first step, a saturated sodium chloride solution 581 (initially formed by the addition of water 580 and sodium chloride 542, in excess of a soluble quantity, to brine pit 579) is acidified by combining it with commercial grade (30–35%) hydrochloric acid 539, preferably in a ratio of 40:1 by weight, to form an acidified salt solution. In the second step, sixth solid phase 535 is combined with the acidified salt solution, preferably in a ratio of approximately 1:25 by weight, to form seventh mixture 549. During continuous operation of sixth digestion reactor 545, recycled saturated sodium chloride eighth liquid phase 581 and recycled used wash water 543 may be collectively or separately recycled for use in providing seventh mixture 549. In a preferred embodiment of the invention, the primary sources of used wash water 543 during continuous operation include used wash water 335 (See FIG. 3), and used wash water 561, but other sources of used wash water are also contemplated.

Seventh mixture 549 in sixth digestion reactor 545 is maintained at approximately 180° F. to 200° F. (82° C. to 93° C.) by heat source 547. Heat source 547 is preferably external to the reactor to minimize fouling. The lead and iron components in sixth solid phase 535 are readily solvated as complex chlorides. Acid chloride digestion is considered complete when the lead content of the solids in seventh mixture 549 are less than 200 ppm as determined by a mass spectrometer, or spectrophotometer or other analyzing device (not shown).

Upon completion of the acid chloride digestion process in sixth digestion reactor 545, a seventh liquid phase 555 and a seventh solid phase 553 are separated from seventh mixture 549 by eighth separation device 551. In this embodiment of the invention, eighth separation device 551 is a gravity settler, or a continuous drum filter, although the use of other separating devices is contemplated.

Seventh solid phase 553 includes as a major component calcium sulfate dihydrate ($CaSO_4 \cdot 2H_2O$), commonly referred to as gypsum. Seventh solid phase 553 may be fed into water wash 557 and washed with water 559, yielding washed gypsum 563, and used wash water 561.

Washed gypsum 563 is approximately 50 to 70% pure gypsum, with the remainder comprised primarily of silicon oxides, i.e. dirt. Washed gypsum 563 can be used as a soil additive. Washed gypsum 563 can also be dried in a dryer (not shown) and transferred to a storage container (not shown) for storage prior to sale or use.

As mentioned above, fifth liquid phase 519 is further processed following filtration by separation device 515.

The fifth liquid phase 519, also called acidic metal chlorides leachate 519, is combined with sodium carbonate 565 to provide eighth mixture 571 in a neutralization reactor 567. Neutralization reactor 567 is preferably a continuous back-mix reactor, although a variety of other reactor types are also contemplated, including continuous plug flow reactors, and agitated batch reactors.

In eighth mixture 571, acidic metal chlorides leachate 519 is neutralized with sodium carbonate 565 for the purpose of precipitating lead carbonate from the acidic chlorides leachate 519. Lead carbonate will most effectively precipitate from eighth mixture 571 once a pH level of pH 7.0 has been met or exceeded.

Eighth mixture 571 in neutralization reactor 567 is maintained at approximately 60° F. to 100° F. (16° C. to 38° C.) by cooling source 569. Cooling source 569 is preferably external to the reactor to minimize fouling. The decrease in the temperature of eighth mixture 571 facilitates the precipitation of lead carbonate from eighth mixture 571. Precipitation additives, such as sodium chromate, a variety of water treatment chemicals, or other equivalent chemicals used to aid precipitation, may be used to complete the precipitation of lead from eighth mixture 571. The neutralization and precipitation process is considered complete when the lead content of the remaining liquids in eighth mixture 571 are less than 10 ppm as determined by a mass spectrometer, or spectrophotometer or other analyzing device (not shown).

Upon completion of the neutralization and precipitation process in neutralization reactor 567, a eighth liquid phase 575 and a eighth solid phase 577 are separated from eighth mixture 571 by ninth separation device 573. In this embodiment of the invention, ninth separation device 573 is either a filter press or drum type filter, although the use of other separating devices is contemplated.

Eighth solid phase 577 includes as a major component the carbonates of lead and iron, with a lead content of preferably 25% to 50%. Eighth solid phase 577 can be used for raw material in lead smelting, and for other commercial purposes.

Eighth liquid phase 575 is passed through a bed of sodium chloride 579, in the form of a brine pit, yielding a saturated sodium chloride eighth liquid phase 581. Saturated sodium chloride eighth liquid phase 581 may be recycled for use in seventh mixture 549 in sixth digestion reactor 545.

DESCRIPTION OF FIGS. 1B AND 6

Figures 6, 6A:
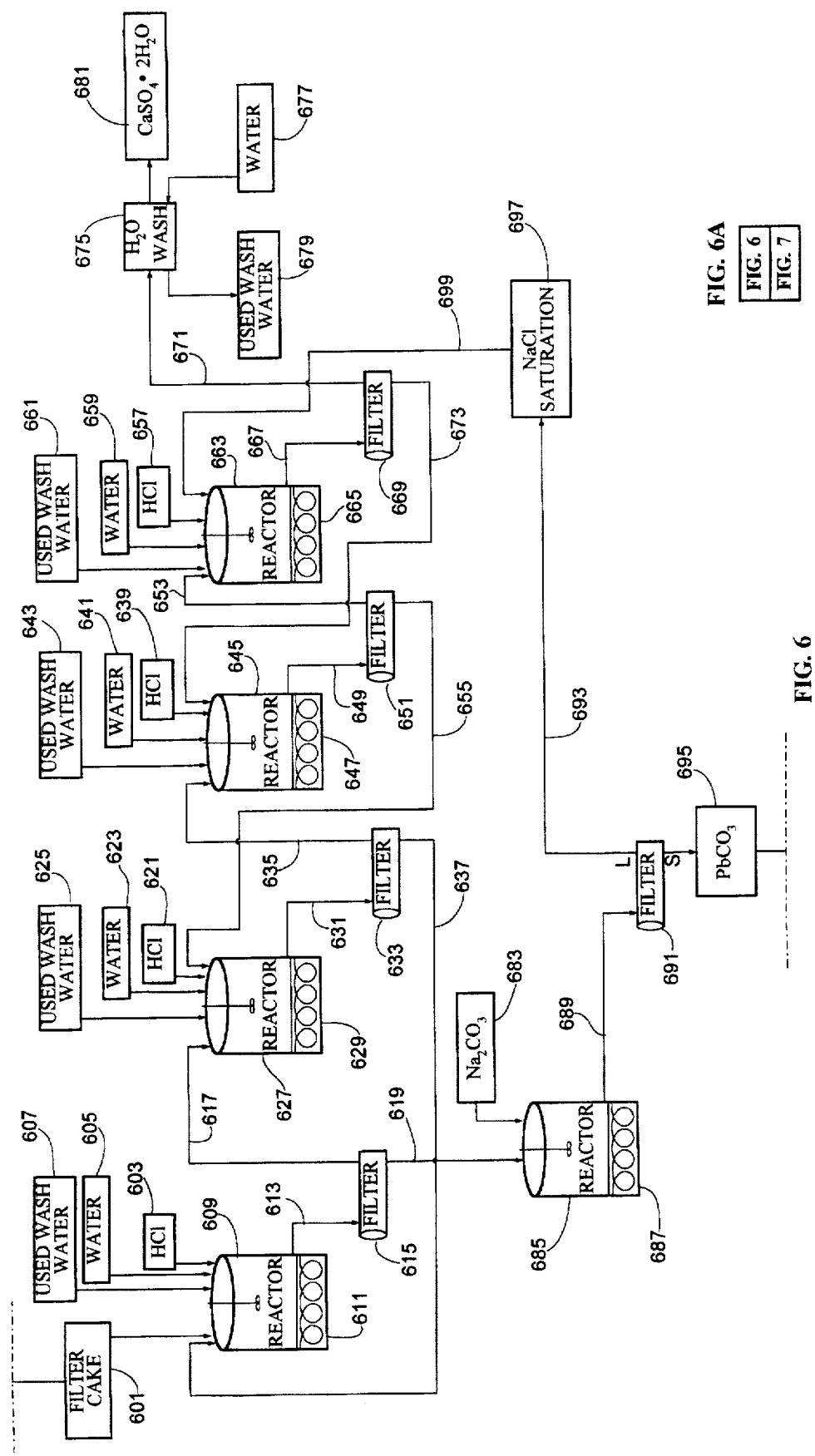
FIG. 6 A notated schematic flow diagram of a four digestion reactor filter cake digestion method and apparatus yielding gypsum, lead carbonate, and bionutrient products.
FIG. 6A shows the interrelation of schematic flow diagrams FIGS. 6 and 7.

A notated schematic flow diagram of a preferred embodiment of the invention is shown in FIG. 1B. In FIG. 1B, the washed filter cake 45, resulting from the separation and recovery of zinc-iron bionutrient products as shown in FIG. 1, is further processed as shown in FIG. 6. In a preferred embodiment of the invention, as continued from FIG. 1 to FIG. 6, the washed filter cake 45 of FIG. 1 is notated in FIG. 6 as washed filter cake 601.

During continuous operation of third digestion reactor 609, as shown in FIG. 6, washed filter cake 601 is combined with sixth liquid phase 637 to form fifth mixture 613. Third digestion reactor 609 is preferably a continuous back-mix reactor, although a variety of other reactor types are also contemplated, including continuous plug flow reactors, and agitated batch reactors.

During the initial start-up phase for third digestion reactor 609, recycled sixth liquid phase 637 and recycled used wash water 607 are not yet available for possible addition to fifth mixture 613. Accordingly, during the initial start-up of third reactor 609, fifth mixture 613 is formed in two steps. In the first step, a saturated sodium chloride solution 604 is acidified by combining it with commercial grade (30–35%) hydrochloric acid 603, preferably in a ratio of 40:1 by weight, to form an acidified salt solution. In the second step, washed filter cake 601 is combined the acidified salt solution, preferably in a ratio of approximately 1:25 by weight, to form fifth mixture 613.

After the initial start-up phase, recycled sixth liquid phase 637 and recycled used wash water 607 may be collectively or separately recycled for use in providing fifth mixture 613. In a preferred embodiment of the invention, the primary sources of used wash water 607 during continuous operation include used wash water 40 (See FIG. 1), and used wash water 679, but other sources of used wash water are also contemplated.

As third digestion reactor 609, fourth digestion reactor 627, fifth digestion reactor 645, and sixth digestion reactor 663 are intended to function as counter current cascading reactors, sixth liquid phase 637 is continuously recycled back into fifth mixture 613 in third digestion reactor 609, seventh liquid phase 655 is continuously recycled back into sixth mixture 631 in fourth digestion reactor 627, and eighth liquid phase 673 is continuously recycled back into seventh mixture 649 in fifth digestion reactor 645.

Fifth mixture 613 in third digestion reactor 609 is maintained at approximately 180° F. to 200° F. (82° C. to 93 ° C.) by heat source 611. Heat source 611 is preferably external to the reactor to minimize fouling. The lead and iron components in washed filter cake 601 are readily solvated as complex chlorides. Acid chloride digestion is considered complete when the lead content of the solids in fifth mixture 613 are less than 5000 ppm as determined by a mass spectrometer, or spectrophotometer or other analyzing device (not shown).

Upon completion of the acid chloride digestion process in third digestion reactor 609, a fifth liquid phase 619 and a fifth solid phase 617 are separated from fifth mixture 613 by seventh separation device 615. In this embodiment of the invention, seventh separation device 615 is a gravity settler, or a continuous drum filter, although the use of other separating devices is contemplated.

Fifth liquid phase 619 is further processed following filtration by seventh separation device 615, as will be explained following the description of how fifth solid phase 617 is processed.

During continuous operation of fourth digestion reactor 627, fifth solid phase 617 is combined with seventh liquid phase 655 to form sixth mixture 631 in fourth digestion reactor 627. Fourth digestion reactor 627 is preferably a continuous back-mix reactor, although a variety of other reactor types are also contemplated, including continuous plug flow reactors, and agitated batch reactors. During the initial start-up phase for fourth digestion reactor 627, recycled seventh liquid phase 655 and recycled used wash water 625 are not yet available for possible addition to sixth mixture 627. Accordingly, during the initial start-up phase of fourth digestion reactor 627, sixth mixture 631 is formed in two steps. In the first step, a saturated sodium chloride solution 622 is acidified by combining it with commercial grade (30–35%) hydrochloric acid 621, preferably in a ratio of 40:1 by weight, to form an acidified salt solution. In the second step, fifth solid phase 617 is combined with the acidified salt solution, preferably in a ratio of approximately 1:25 by weight, to form sixth mixture 631.

After the initial start-up phase, recycled seventh liquid phase 655 and recycled used wash water 625 may be collectively or separately recycled for use in providing sixth mixture 631. In a preferred embodiment of the invention, the primary sources of used wash water 625 during continuous operation include used wash water 40 (See FIG. 1), and used wash water 679, but other sources of used wash water are also contemplated.

Sixth mixture 631 in fourth digestion reactor 627 is maintained at approximately 180° F. to 200° F. (82° C. to 93° C.) by heat source 629. Heat source 629 is preferably external to the reactor to minimize fouling. The lead and iron components in fifth solid phase 617 are readily solvated as complex chlorides. Acid chloride digestion is considered complete when the lead content of the solids in sixth mixture 631 are less than 1200 ppm as determined by a mass spectrometer, or spectrophotometer or other analyzing device (not shown).

Upon completion of the acid chloride digestion process in fourth digestion reactor 627, an sixth liquid phase 637 and an sixth solid phase 635 are separated from sixth mixture 631 by eighth separation device 633. In this embodiment of the invention, eighth separation device 633 is a gravity settler, or a continuous drum filter, although the use of other separating devices is contemplated.

During continuous operation of fifth digestion reactor 645, sixth solid phase 635 is combined with eighth liquid phase 673 to form seventh mixture 649 in fifth digestion reactor 645. Fifth digestion reactor 645 is preferably a continuous back-mix reactor, although a variety of other reactor types are also contemplated, including continuous plug flow reactors, and agitated batch reactors.

During the initial start-up phase for fifth digestion reactor 645, recycled eighth liquid phase 673, and recycled used wash water 643 are not yet available for possible addition to seventh mixture 649. Accordingly, during the initial start-up of fifth digestion reactor 645, seventh mixture 649 is formed in two steps. In the first step, a saturated sodium chloride solution 642 is acidified by combining it with commercial grade (30–35%) hydrochloric acid 639, preferably in a ratio of 40:1 by weight, to form an acidified salt solution. In the second step, sixth solid phase 635 is combined with the acidified salt solution, preferably in a ratio of approximately 1:25 by weight, to form seventh mixture 649.

After the initial start-up phase, recycled eighth liquid phase 673 and recycled used wash water 643 may be collectively or separately recycled for use in providing seventh mixture 649. In a preferred embodiment of the invention, the primary sources of used wash water 643 during continuous operation include used wash water 40 (See FIG. 1), and used wash water 679, but other sources of used wash water are also contemplated.

Seventh mixture 649 in fifth digestion reactor 645 is maintained at approximately 180° F. to 200° F. (82° C. to 93° C.) by heat source 647. Heat source 647 is preferably external to the reactor to minimize fouling. The lead and iron components in seventh solid phase 635 are readily solvated as complex chlorides. Acid chloride digestion is considered complete when the lead content of the solids in seventh mixture 649 are less than 300 ppm as determined by a mass spectrometer, or spectrophotometer or other analyzing device (not shown).

Upon completion of the acid chloride digestion process in fifth digestion reactor 645, a seventh liquid phase 655 and a seventh solid phase 653 are separated from seventh mixture 649 by ninth separation device 651. In this embodiment of the invention, ninth separation device 651 is a gravity settler, or a continuous drum filter, although the use of other separating devices is contemplated.

Seventh solid phase 653 is combined with hydrochloric acid 657 and a saturated sodium chloride solution 699 to form eighth mixture 667 in sixth digestion reactor 663. Sixth digestion reactor 663 is preferably a continuous back-mix reactor, although a variety of other reactor types are also contemplated, including continuous plug flow reactors, and agitated batch reactors.

Eighth mixture 667 is formed in two steps. In the first step, a saturated sodium chloride solution 699 (initially formed by the addition of water 696 and sodium chloride 658, in excess of a soluble quantity, to brine pit 697) is acidified by combining it with commercial grade (30–35%) hydrochloric acid 657, preferably in a ratio of 40:1 by weight, to form an acidified salt solution. In the second step, seventh solid phase 653 is combined with the acidified salt solution, preferably in a ratio of approximately 1:25 by weight, to form eighth mixture 667. During continuous operation of sixth digestion reactor 663, recycled saturated sodium chloride ninth liquid phase 699 and recycled used wash water 661 may be collectively or separately recycled for use in providing eighth mixture 667. In a preferred embodiment of the invention, the primary sources of used wash water 661 during continuous operation include used wash water 40 (See FIG. 1), and used wash water 679, but other sources of used wash water are also contemplated.

Eighth mixture 667 in sixth digestion reactor 663 is maintained at approximately 180° F. to 200° F. (82° C. to 93° C.) by heat source 665. Heat source 665 is preferably external to the reactor to minimize fouling. The lead and iron components in seventh solid phase 653 are readily solvated as complex chlorides. Acid chloride digestion is considered complete when the lead content of the solids in eighth mixture 667 are less than 70 ppm as determined by a mass spectrometer, or spectrophotometer or other analyzing device (not shown).

Upon completion of the acid chloride digestion process in sixth digestion reactor 663, a eighth liquid phase 673 and a eighth solid phase 671 are separated from eighth mixture 667 by tenth separation device 669. In a preferred embodiment of the invention, tenth separation device 669 is a gravity settler, or a continuous drum filter, although the use of other separating devices is contemplated.

Eighth solid phase 671 includes as a major component calcium sulfate dihydrate ($CaSO_4 \cdot 2H_2O$), commonly referred to as gypsum. Eighth solid phase 671 may be fed into water wash 675 and washed with water 677, yielding washed gypsum 681, and used wash water 679.

Washed gypsum 681 is approximately 50 to 70% pure gypsum, with the remainder comprised primarily of silicon oxides, i.e. dirt. Washed gypsum 681 can be used as a soil additive. Washed gypsum 681 can also be dried in a dryer (not shown) and transferred to a storage container (not shown) for storage prior to sale or use.

As mentioned above, fifth liquid phase 619 is further processed following filtration by separation device 615.

The fifth liquid phase 619, also called acidic metal chlorides leachate 619, is combined with sodium carbonate 683 to provide a ninth mixture 689 in a neutralization reactor 685. Neutralization reactor 685 is preferably a continuous back-mix reactor, although a variety of other reactor types are also contemplated, including continuous plug flow reactors, and agitated batch reactors.

In ninth mixture 689, acidic metal chlorides leachate 619 is neutralized with sodium carbonate 683 for the purpose of precipitating lead carbonate from the acidic chlorides leachate 619. Lead carbonate will most effectively precipitate from ninth mixture 689 once a pH level of pH 7.0 has been met or exceeded.

Ninth mixture 689 in neutralization reactor 685 is maintained at approximately 60° F. to 100° F. (16° C. to 38° C.) by cooling source 687. Cooling source 687 is preferably external to the reactor to minimize fouling. The decrease in the temperature of ninth mixture 689 facilitates the precipitation of lead carbonate from ninth mixture 689. Precipitation additives, such as sodium chromate, a variety of water treatment chemicals, or other equivalent chemicals used to aid precipitation, may be used to complete the precipitation of lead from ninth mixture 689. The neutralization and precipitation process is considered complete when the lead content of the remaining liquids in ninth mixture 689 are less than 10 ppm as determined by a mass spectrometer, or spectrophotometer or other analyzing device (not shown).

Upon completion of the neutralization and precipitation process in neutralization reactor 685, a ninth liquid phase 693 and a ninth solid phase 695 are separated from ninth mixture 689 by eleventh separation device 691. In this embodiment of the invention, eleventh separation device 691 is either a filter press or drum type filter, although the use of other separating devices is contemplated.

Ninth solid phase 695, includes as a major component the carbonates of lead and iron, with a lead content of preferably 25% to 50%. Ninth solid phase 695 can be used for raw material in lead smelting, and for other commercial purposes.

Ninth liquid phase 693 is passed through a bed of sodium chloride 658, which is added to a brine pit 697, yielding a saturated sodium chloride ninth liquid phase 699. Sodium chloride saturated ninth liquid phase 699 may be recycled for use in eighth mixture 667 in sixth digestion reactor 663.

DESCRIPTION OF FIGS. 2B and 6

A notated schematic flow diagram of a preferred embodiment of the invention is shown in FIG. 2B. In FIG. 2B, the washed filter cake 245, resulting from the separation and recovery of zinc-iron bionutrient products as shown in FIG. 2, is further processed as shown in FIG. 6. In a preferred embodiment of the invention, as continued from FIG. 2 to FIG. 6, the washed filter cake 245 of FIG. 2 is notated in FIG. 6 as washed filter cake 601.

During continuous operation of third digestion reactor 609, as shown in FIG. 6, washed filter cake 601 is combined with fifth liquid phase 637 to form fourth mixture 613. Third digestion reactor 609 is preferably a continuous back-mix reactor, although a variety of other reactor types are also contemplated, including continuous plug flow reactors, and agitated batch reactors.

During the initial start-up phase for third digestion reactor 609, recycled fifth liquid phase 637 and recycled used wash water 607 are not yet available for possible addition to fourth mixture 613. Accordingly, during the initial start-up phase of third digestion reactor 609, fourth mixture 613 is formed in two steps. In the first step, a saturated sodium chloride solution 604 is acidified by combining it with commercial grade (approximately 30% to 35%) hydrochloric acid 603, preferably in a ratio of 40:1 by weight, to form an acidified salt solution. In the second step, washed filter cake 601 is combined the acidified salt solution, preferably in a ratio of approximately 1:25 by weight, to form fourth mixture 613.

After the initial start-up phase, recycled fifth liquid phase 637 and recycled used wash water 607 may be collectively or separately recycled for use in providing fourth mixture 613. In a preferred embodiment of the invention, the primary sources of used wash water 607 during continuous operation include used wash water 240 (See FIG. 2), and used wash water 679, but other sources of used wash water are also contemplated.

As third digestion reactor 609, fourth digestion reactor 627, fifth digestion reactor 645, and sixth digestion reactor 663 are intended to function as counter current cascading reactors, fifth liquid phase 637 is continuously recycled back into fourth mixture 613 in third digestion reactor 609, sixth liquid phase 655 is continuously recycled back into fifth mixture 631 in fourth digestion reactor 627, and seventh liquid phase 673 is continuously recycled back into sixth mixture 649 in fifth digestion reactor 645.

Fourth mixture 613 in third digestion reactor 609 is maintained at approximately 180° F. to 200° F. (82° C. to 93° C.) by heat source 611. Heat source 611 is preferably external to the reactor to minimize fouling. The lead and iron components in washed filter cake 601 are readily solvated as complex chlorides. Acid chloride digestion is considered complete when the lead content of the solids in fourth mixture 613 are less than 5000 ppm as determined by a mass spectrometer, or spectrophotometer or other analyzing device (not shown).

Upon completion of the acid chloride digestion process in third digestion reactor 609, a fourth liquid phase 619 and a fourth solid phase 617 are separated from fourth mixture 613 by fifth separation device 615. In this embodiment of the invention, fifth separation device 615 is a gravity settler, or a continuous drum filter, although the use of other separating devices is contemplated.

Fourth liquid phase 619 is further processed following filtration by fifth separation device 615, as will be explained following the description of how fourth solid phase 617 is processed.

During continuous operation of fourth digestion reactor 627, fourth solid phase 617 is combined with sixth liquid phase 655 to form fifth mixture 631. Fourth digestion reactor 627 is preferably a continuous back-mix reactor, although a variety of other reactor types are also contemplated, including continuous plug flow reactors, and agitated batch reactors.

During the initial start-up phase for fourth digestion reactor 627, recycled sixth liquid phase 655 and recycled used wash water 625 are not yet available for possible addition to fifth mixture 627. Accordingly, during the initial start-up phase of fourth digestion reactor 627, fifth mixture 631 is formed in two steps. In the first step, a saturated sodium chloride solution 622 is acidified by combining it with commercial grade (30–35%) hydrochloric acid 621, preferably in a ratio of 40:1 by weight, to form an acidified salt solution. In the second step, fourth solid phase 617 is combined with the acidified salt solution, preferably in a ratio of approximately 1:25 by weight, to form fifth mixture 631.

After the initial start-up phase, recycled sixth liquid phase 655 and recycled used wash water 625 may be collectively or separately recycled for use in providing fifth mixture 631. In a preferred embodiment of the invention, the primary sources of used wash water 625 during continuous operation include used wash water 240 (See FIG. 2), and used wash water 679, but other sources of used wash water are also contemplated.

Fifth mixture 631 in fourth digestion reactor 627 is maintained at approximately 180° F. to 200° F. (82° C. to 93° C.) by heat source 629. Heat source 629 is preferably external to the reactor to minimize fouling. The lead and iron components in fourth solid phase 617 are readily solvated as complex chlorides. Acid chloride digestion is considered complete when the lead content of the solids in fifth mixture 631 are less than 1200 ppm as determined by a mass spectrometer, or spectrophotometer or other analyzing device (not shown).

Upon completion of the acid chloride digestion process in fourth digestion reactor 627, an fifth liquid phase 637 and an fifth solid phase 635 are separated from fifth mixture 631 by sixth separation device 633. In this embodiment of the invention, sixth separation device 633 is a gravity settler, or a continuous drum filter, although the use of other separating devices is contemplated.

During continuous operation of fifth digestion reactor 645, fifth solid phase 635 is combined with seventh liquid phase 673 to form sixth mixture 649. Fifth digestion reactor 645 is preferably a continuous back-mix reactor, although a variety of other reactor types are also contemplated, including continuous plug flow reactors, and agitated batch reactors.

During the initial start-up phase for fifth digestion reactor 645, recycled seventh liquid phase 673, and recycled used wash water 643 are not yet available for possible addition to sixth mixture 649. Accordingly, during the initial start-up phase of fifth digestion reactor 645, sixth mixture 649 is formed in two steps. In the first step, a saturated sodium chloride solution 642 is acidified by combining it with commercial grade (30–35%) hydrochloric acid 639, preferably in a ratio of 40:1 by weight, to form an acidified salt solution. In the second step, fifth solid phase 635 is combined with the acidified salt solution, preferably in a ratio of approximately 1:25 by weight, to form sixth mixture 649.

After the initial start-up phase, recycled seventh liquid phase 673 and recycled used wash water 643 may be collectively or separately recycled for use in providing sixth mixture 649. In a preferred embodiment of the invention, the primary sources of used wash water 643 during continuous operation include used wash water 240 (See FIG. 2), and used wash water 679, but other sources of used wash water are also contemplated.

Sixth mixture 649 in fifth digestion reactor 645 is maintained at approximately 180° F. to 200° F. (82° C. to 93° C.) by heat source 647. Heat source 647 is preferably external to the reactor to minimize fouling. The lead and iron components in sixth solid phase 635 are readily solvated as complex chlorides. Acid chloride digestion is considered complete when the lead content of the solids in sixth mixture 649 are less than 300 ppm as determined by a mass spectrometer, or spectrophotometer or other analyzing device (not shown).

Upon completion of the acid chloride digestion process in fifth digestion reactor 645, a sixth liquid phase 655 and a sixth solid phase 653 are separated from sixth mixture 649 by seventh separation device 651. In this embodiment of the invention, seventh separation device 651 is a gravity settler, or a continuous drum filter, although the use of other separating devices is contemplated.

Sixth solid phase 653 is combined with hydrochloric acid 657 and a saturated sodium chloride solution 699 to form seventh mixture 667 in sixth digestion reactor 663. Sixth digestion reactor 663 is preferably a continuous back-mix reactor, although a variety of other reactor types are also contemplated, including continuous plug flow reactors, and agitated batch reactors.

Seventh mixture 667 is formed in two steps. In the first step, a saturated sodium chloride solution 699 (initially formed by the addition of water 696 and sodium chloride 658, in excess of a soluble quantity, to brine pit 697) is acidified by combining it with commercial grade (30–35%) hydrochloric acid 657, preferably in a ratio of 40:1 by weight, to form an acidified salt solution. In the second step, sixth solid phase 653 is combined with the acidified salt solution, preferably in a ratio of approximately 1:25 by weight, to form seventh mixture 667.

During continuous operation of sixth digestion reactor 663, recycled saturated sodium chloride eighth liquid phase 699 and recycled used wash water 661 may be collectively or separately recycled for use in providing seventh mixture 667. In a preferred embodiment of the invention, the primary sources of used wash water 661 during continuous operation include used wash water 240 (See FIG. 2), and used wash water 679, but other sources of used wash water are also contemplated.

Seventh mixture 667 in sixth digestion reactor 663 is maintained at approximately 180° F. to 2000° F. (82° C. to 93° C.) by heat source 665. Heat source 665 is preferably external to the reactor to minimize fouling. The lead and iron components in sixth solid phase 653 are readily solvated as complex chlorides. Acid chloride digestion is considered complete when the lead content of the solids in seventh mixture 667 are less than 70 ppm as determined by a mass spectrometer, or spectrophotometer or other analyzing device (not shown).

Upon completion of the acid chloride digestion process in sixth digestion reactor 663, a seventh liquid phase 673 and a seventh solid phase 671 are separated from seventh mixture 667 by eighth separation device 669. In this embodiment of the invention, eighth separation device 669 is a gravity settler, or a continuous drum filter, although the use of other separating devices is contemplated.

Seventh solid phase 671 includes as a major component calcium sulfate dihydrate ($CaSO_4.2H_2O$), commonly referred to as gypsum. Seventh solid phase 671 may be fed into water wash 675 and washed with water 677, yielding washed gypsum 681, and used wash water 679.

Washed gypsum 681 is approximately 50 to 70% pure gypsum, with the remainder comprised primarily of silicon oxides, i.e. dirt. Washed gypsum 681 can be used as a soil additive. Washed gypsum 681 can also be dried in a dryer (not shown) and transferred to a storage container (not shown) for storage prior to sale or use.

As mentioned above, fourth liquid phase 619 is further processed following filtration by separation device 615.

The fourth liquid phase 619, also called acidic metal chlorides leachate 619, is combined with sodium carbonate 683 to provide a eighth mixture 689 in a neutralization reactor 685. Neutralization reactor 685 is preferably a continuous back-mix reactor, although a variety of other reactor types are also contemplated, including continuous plug flow reactors, and agitated batch reactors.

In eighth mixture 689, acidic metal chlorides leachate 619 is neutralized with sodium carbonate 683 for the purpose of precipitating lead carbonate from the acidic chlorides leachate 619. Lead carbonate will most effectively precipitate from eighth mixture 689 once a pH level of pH 7.0 has been met or exceeded.

Eighth mixture 689 in neutralization reactor 685 is maintained at approximately 60° F. to 100° F. (16° C. to 38° C.) by cooling source 687. Cooling source 687 is preferably external to the reactor to minimize fouling. The decrease in the temperature of eighth mixture 689 facilitates the precipitation of lead carbonate from eighth mixture 689. Precipitation additives, such as sodium chromate, a variety of water treatment chemicals, or other equivalent chemicals used to aid precipitation, may be used to complete the precipitation of lead from eighth mixture 689. The neutralization and precipitation process is considered complete when the lead content of the remaining liquids in eighth mixture 689 are less than 10 ppm as determined by a mass spectrometer, or spectrophotometer or other analyzing device (not shown).

Upon completion of the neutralization and precipitation process in neutralization reactor 685, a eighth liquid phase 693 and a eighth solid phase 695 are separated from eighth mixture 689 by ninth separation device 691. In this embodiment of the invention, ninth separation device 691 is either a filter press or drum type filter, although the use of other separating devices is contemplated.

Eighth solid phase 695, includes as a major component the carbonates of lead and iron, with a lead content of preferably 25% to 50%. Eighth solid phase 695 can be used for raw material in lead smelting, and for other commercial purposes.

Eighth liquid phase 693 is passed through a bed of sodium chloride 697, in the form of a brine pit, yielding a saturated sodium chloride eighth liquid phase 699. Saturated sodium chloride eighth liquid phase 699 may be recycled for use in seventh mixture 667 in sixth digestion reactor 663.

DESCRIPTION OF FIGS. 3B AND 6

A notated schematic flow diagram of a preferred embodiment of the invention is shown in FIG. 3B. In FIG. 3B, the water washed third solid phase 336, resulting from the separation and recovery of zinc-iron bionutrient products as shown in FIG. 3, is further processed as shown in FIG. 6. In a preferred embodiment of the invention, as continued from FIG. 3 to FIG. 6, the water washed third solid phase 336 of FIG. 3 is notated in FIG. 6 as washed filter cake 601.

During continuous operation of fourth digestion reactor 609, as shown in FIG. 6, washed filter cake 601 is combined with sixth liquid phase 637 to form fifth mixture 613. Fourth digestion reactor 609 is preferably a continuous back-mix reactor, although a variety of other reactor types are also contemplated, including continuous plug flow reactors, and agitated batch reactors.

During the initial start-up phase for fourth digestion reactor 609, recycled sixth liquid phase 637 and recycled used wash water 607 are not yet available for possible addition to fifth mixture 613. Accordingly, during the initial start-up phase of fourth digestion reactor 609, fifth mixture 613 is formed in two steps. In the first step, a saturated sodium chloride solution 604 is acidified by combining it with commercial grade (30–35%) hydrochloric acid 603, preferably in a ratio of 40:1 by weight, to form an acidified salt solution. In the second step, washed filter cake 601 is combined the acidified salt solution, preferably in a ratio of approximately 1:25 by weight, to form fifth mixture 613.

After the initial start-up phase, recycled sixth liquid phase 637 and recycled used wash water 607 may be collectively or separately recycled for use in providing fifth mixture 613. In a preferred embodiment of the invention, the primary sources of used wash water 607 during continuous operation include used wash water 335 (See FIG. 3), and used wash water 679, but other sources of used wash water are also contemplated.

As fourth digestion reactor 609, fifth digestion reactor 627, sixth digestion reactor 645, and seventh digestion reactor 663 are intended to function as counter current cascading reactors, sixth liquid phase 637 is continuously recycled back into fifth mixture 613 in fourth digestion reactor 609, seventh liquid phase 655 is continuously recycled back into sixth mixture 631 in fifth digestion reactor 627, and eighth liquid phase 673 is continuously recycled back into seventh mixture 649 in sixth digestion reactor 645.

Fifth mixture 613 in fourth digestion reactor 609 is maintained at approximately 180° F. to 200° F. (82° C. to 93° C.) by heat source 611. Heat source 611 is preferably external to the reactor to minimize fouling. The lead and iron components in washed filter cake 601 are readily solvated as complex chlorides. Acid chloride digestion is considered complete when the lead content of the solids in fifth mixture 613 are less than 5000 ppm as determined by a mass spectrometer, or spectrophotometer or other analyzing device (not shown).

Upon completion of the acid chloride digestion process in fourth digestion reactor 609, a fifth liquid phase 619 and a fifth solid phase 617 are separated from fifth mixture 613 by sixth separation device 615. In this embodiment of the invention, sixth separation device 615 is a gravity settler, or a continuous drum filter, although the use of other separating devices is contemplated.

Fifth liquid phase 619 is further processed following filtration by sixth separation device 615, as will be explained following the description of how fifth solid phase 617 is processed.

During continuous operation of fifth digestion reactor 627, fifth solid phase 617 is combined with seventh liquid phase 655 to form sixth mixture 631. Fifth digestion reactor 627 is preferably a continuous back-mix reactor, although a variety of other reactor types are also contemplated, including continuous plug flow reactors, and agitated batch reactors.

During the initial start-up phase for fifth digestion reactor 627, recycled seventh liquid phase 655 and recycled used wash water 625 are not yet available for possible addition to sixth mixture 627. Accordingly, during the initial start-up phase of fifth digestion reactor 627, sixth mixture 631 is formed in two steps. In the first step, a saturated sodium chloride solution 622 is acidified by combining it with commercial grade (30–35%) hydrochloric acid 621, preferably in a ratio of 40:1 by weight, to form an acidified salt solution. In the second step, fifth solid phase 617 is combined with the acidified salt solution, preferably in a ratio of approximately 1:25 by weight, to form sixth mixture 631.

After the initial start-up phase, recycled seventh liquid phase 655 and recycled used wash water 625 may be collectively or separately recycled for use in providing sixth mixture 631. In a preferred embodiment of the invention, the primary sources of used wash water 625 during continuous operation include used wash water 335 (See FIG. 3), and used wash water 679, but other sources of used wash water are also contemplated.

Sixth mixture 631 in fifth digestion reactor 627 is maintained at approximately 180° F. to 200° F. (82° C. to 93° C.) by heat source 629. Heat source 629 is preferably external to the reactor to minimize fouling. The lead and iron components in fifth solid phase 617 are readily solvated as complex chlorides. Acid chloride digestion is considered complete when the lead content of the solids in sixth mixture 631 are less than 1200 ppm as determined by a mass spectrometer, or spectrophotometer or other analyzing device (not shown).

Upon completion of the acid chloride digestion process in fifth digestion reactor 627, an sixth liquid phase 637 and an sixth solid phase 635 are separated from sixth mixture 631 by seventh separation device 633. In this embodiment of the invention, seventh separation device 633 is a gravity settler, or a continuous drum filter, although the use of other separating devices is contemplated.

During continuous operation of sixth digestion reactor 645, sixth solid phase 635 is combined with eighth liquid phase 673 to form seventh mixture 649. Sixth digestion reactor 645 is preferably a continuous back-mix reactor, although a variety of other reactor types are also contemplated, including continuous plug flow reactors, and agitated batch reactors.

During the initial start-up phase for sixth digestion reactor 645, recycled eighth liquid phase 673, and recycled used wash water 643 are not yet available for possible addition to seventh mixture 649. Accordingly, during the start-up phase of sixth digestion reactor 645, seventh mixture 649 is formed in two steps. In the first step, a saturated sodium chloride solution 642 is acidified by combining it with commercial grade (30–35%) hydrochloric acid 639, preferably in a ratio of 40:1 by weight, to form an acidified salt solution. In the second step, sixth solid phase 635 is combined with the acidified salt solution, preferably in a ratio of approximately 1:25 by weight, to form seventh mixture 649.

After the initial start-up phase, recycled eighth liquid phase 673 and recycled used wash water 643 may be collectively or separately recycled for use in providing seventh mixture 649. In a preferred embodiment of the invention, the primary sources of used wash water 643 during continuous operation include used wash water 335 (See FIG. 3), and used wash water 679, but other sources of used wash water are also contemplated.

Seventh mixture 649 in sixth digestion reactor 645 is maintained at approximately 180° F. to 200° F. (82° C. to 93° C.) by heat source 647. Heat source 647 is preferably external to the reactor to minimize fouling. The lead and iron components in seventh solid phase 635 are readily solvated as complex chlorides. Acid chloride digestion is considered complete when the lead content of the solids in seventh mixture 649 are less than 300 ppm as determined by a mass spectrometer, or spectrophotometer or other analyzing device (not shown).

Upon completion of the acid chloride digestion process in sixth digestion reactor 645, a seventh liquid phase 655 and a seventh solid phase 653 are separated from seventh mixture 649 by eighth separation device 651. In this embodiment of the invention, eighth separation device 651 is a gravity settler, or a continuous drum filter, although the use of other separating devices is contemplated.

Seventh solid phase 653 is combined with hydrochloric acid 657 and saturated sodium chloride solution 699 to form eighth mixture 667 in seventh digestion reactor 663. Seventh digestion reactor 663 is preferably a continuous back-mix reactor, although a variety of other reactor types are also contemplated, including continuous plug flow reactors, and agitated batch reactors.

Eighth mixture 667 is formed in two steps. In the first step, a saturated sodium chloride solution 699 (initially formed by the addition of water 696 and sodium chloride 658, in excess of a soluble quantity, to brine pit 697) is acidified by combining it with commercial grade (30–35%) hydrochloric acid 657, preferably in a ratio of 40:1 by weight, to form an acidified salt solution. In the second step, seventh solid phase 653 is combined with the acidified salt solution, preferably in a ratio of approximately 1:25 by weight, to form eighth mixture 667. During continuous operation of seventh digestion reactor 663, recycled saturated sodium chloride ninth liquid phase 699 and recycled used wash water 661 may be collectively or separately recycled for use in providing eighth mixture 667. In a preferred embodiment of the invention, the primary sources of used wash water 661 during continuous operation include used wash water 335 (See FIG. 3), and used wash water 679, but other sources of used wash water are also contemplated.

Eighth mixture 667 in seventh digestion reactor 663 is maintained at approximately 180° F. to 200° F. (82° C. to 93° C.) by heat source 665. Heat source 665 is preferably external to the reactor to minimize fouling. The lead and iron components in seventh solid phase 653 are readily solvated as complex chlorides. Acid chloride digestion is considered complete when the lead content of the solids in eighth mixture 667 are less than 70 ppm as determined by a mass spectrometer, or spectrophotometer or other analyzing device (not shown).

Upon completion of the acid chloride digestion process in seventh digestion reactor 663, a eighth liquid phase 673 and a eighth solid phase 671 are separated from eighth mixture 667 by ninth separation device 669. In this embodiment of the invention, ninth separation device 669 is a gravity settler, or a continuous drum filter, although the use of other separating devices is contemplated.

Eighth solid phase 671 includes as a major component calcium sulfate dihydrate ($CaSO_4.2H_2O$), commonly referred to as gypsum. Eighth solid phase 671 may be fed into water wash 675 and washed with water 677, yielding washed gypsum 681, and used wash water 679.

Washed gypsum 681 is approximately 50 to 70% pure gypsum, with the remainder comprised primarily of silicon oxides, i.e. dirt. Washed gypsum 681 can be used as a soil additive. Washed gypsum 681 can also be dried in a dryer (not shown) and transferred to a storage container (not shown) for storage prior to sale or use.

As mentioned above, fifth liquid phase 619 is further processed following filtration by separation device 615.

The fifth liquid phase 619, also called acidic metal chlorides leachate 619, is combined with sodium carbonate 683 to provide a ninth mixture 689 in a neutralization reactor 685. Neutralization reactor 685 is preferably a continuous back-mix reactor, although a variety of other reactor types are also contemplated, including continuous plug flow reactors, and agitated batch reactors.

In ninth mixture 689, acidic metal chlorides leachate 619 is neutralized with sodium carbonate 683 for the purpose of precipitating lead carbonate from the acidic chlorides leachate 619. Lead carbonate will most effectively precipitate from ninth mixture 689 once a pH level of pH 7.0 has been met or exceeded.

Ninth mixture 689 in neutralization reactor 685 is maintained at approximately 60° F. to 100° F. (16° C. to 38° C.) by cooling source 687. Cooling source 687 is preferably external to the reactor to minimize fouling. The decrease in the temperature of ninth mixture 689 facilitates the precipitation of lead carbonate from ninth mixture 689. Precipitation additives, such as sodium chromate, a variety of water treatment chemicals, or other equivalent chemicals used to aid precipitation, may be used to complete the precipitation of lead from ninth mixture 689. The neutralization and precipitation process is considered complete when the lead content of the remaining liquids in ninth mixture 689 are less than 10 ppm as determined by a mass spectrometer, or spectrophotometer or other analyzing device (not shown).

Upon completion of the neutralization and precipitation process in neutralization reactor 685, a ninth liquid phase 693 and a ninth solid phase 695 are separated from ninth mixture 689 by tenth separation device 691. In this embodiment of the invention, tenth separation device 691 is either a filter press or drum type filter, although the use of other separating devices is contemplated.

Ninth solid phase 695 includes as a major component the carbonates of lead and iron, with a lead content of preferably 25% to 50%. Ninth solid phase 695 can be used for raw material in lead smelting, and for other commercial purposes.

Ninth liquid phase 693 is passed through a bed of sodium chloride 697, in the form of a brine pit, yielding a saturated sodium chloride ninth liquid phase 699. Saturated sodium chloride ninth liquid phase 699 may be recycled for use in eighth mixture 667 in seventh digestion reactor 663.

Figure 7:
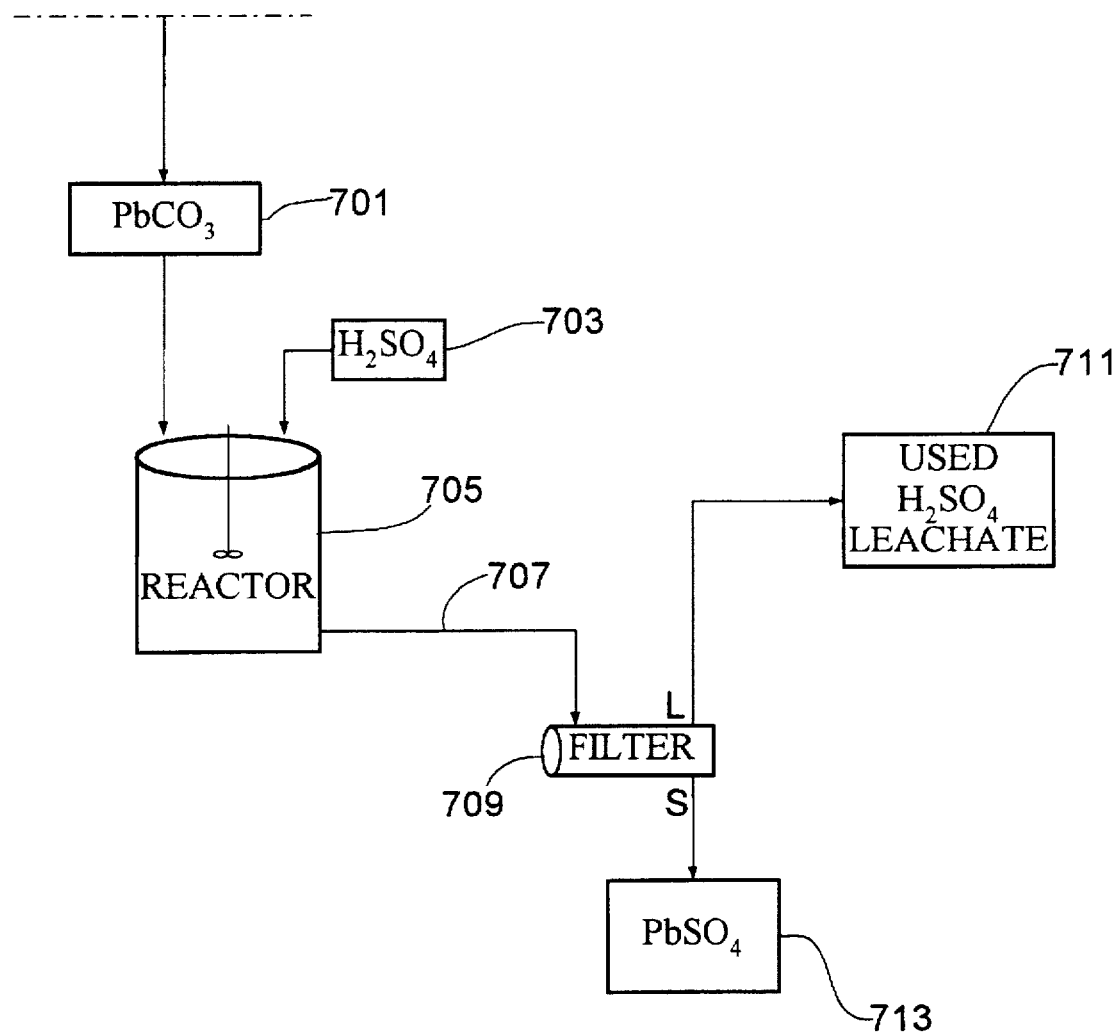
FIG. 7 A notated schematic flow diagram of a single reactor method and apparatus for converting lead carbonate to lead sulfate.

DESCRIPTION OF FIGS. 5A, 6A and 7

Notated schematic flow diagrams of an alternate embodiment of the invention is shown in FIGS. 5A and 6A. In FIG. 5A, the water washed lead carbonate 577 shown in FIG. 5, which is separated and recovered from the waste steam generated by the zinc-iron bionutrient product manufacturing processes as shown in FIGS. 1, 2, and 3, is further processed as shown in FIG. 7. In FIG. 6A, the water washed lead carbonate 695 shown in FIG. 6, which is separated and recovered from the waste steam generated by the zinc-iron bionutrient product manufacturing processes as shown in FIGS. 1, 2, and 3, is further processed as shown in FIG. 7.

In a preferred embodiment of the invention, shown in FIG. 5A as continued from FIG. 5 to FIG. 7, the water washed lead carbonate 577 of FIG. 5 is notated in FIG. 7 as water washed lead carbonate 701. In an alternate embodiment of the invention, shown in FIG. 6A as continued from FIG. 6 to FIG. 7, the water washed lead carbonate 695 of FIG. 6 is notated in FIG. 7 as water washed lead carbonate 701.

In FIG. 7, water washed lead carbonate 701 is combined with sulfuric acid 703, in excess of stoichiometric ratios, to form an acidic sulfate transformation mixture 707 in sulfate transformation reactor 705. The sulfuric acid solution 703 is produced by combining concentrated sulfuric acid (preferably commercial grade, 93% $H_2SO_4$) with a small amount of water to aid in iron solvation. Sulfate transformation reactor 705 is preferably a continuous back-mix reactor, although a variety of other reactor types are also contemplated, including continuous plug flow reactors, and agitated batch reactors.

One purpose of sulfate transformation reaction 705 is to reduce the iron contamination of lead carbonate 701. To accomplish this purpose, the pH of acidic sulfate transformation mixture 707 must be maintained at less than pH 1.0 to effectively leach ferric iron from the lead carbonate 701. The iron is leached into the effluent used sulfuric acid leachate 711, leaving a substantially pure residue of lead sulfate 713. Transformation of lead carbonate 701 to lead sulfate is considered complete when the iron content of the remaining solids in the acidic sulfate transformation mixture 707 are less than 10% as determined by a mass spectrometer, or spectrophotometer or other analyzing device (not shown).

Upon completion of the sulfate transformation process in sulfate transformation reactor 705, a used sulfuric acid leachate 711 and a lead sulfate filter cake 713 are separated from acidic sulfate transformation mixture 707 by separation device 709. In a preferred embodiment of the invention, separation device 709 is a filter press, a drum type filter, or other type of filter.

Lead sulfate filter cake 713 includes as a major component lead sulfate, and can be used as raw material in lead smelting, and for many other commercial purposes.

Used sulfuric acid leachate 711 includes the majority of the ferric iron remaining in lead carbonate 701, and can be recycled for use in digestion reactor 16 as shown FIG. 1; digestion reactors 215 or 229 as shown in FIG. 2; or digestion reactors 307, 313, or 323, as shown in FIG. 3.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

I claim:

1. A process for forming a bionutrient solution having a specific iron concentration and a specific zinc concentration, comprising the steps of,
    a) leaching a raw material with a first acid to form a first leaching mixture, the first leached mixture having a pH greater than approximately pH 1.0 the first leached mixture including a first leached liquid phase and a first residual solid phase, and the raw material including a zinc component, an iron component, a cadmium component, a copper component, and a chromium component;
    b) separating from said first leaching mixture, said first leached liquid phase and said first residual solid phase, the first leached liquid phase substantially including the zinc component of said raw material;
    c) combining said first leached liquid phase with a first reducing agent to form a zinc reducing mixture, the first leached liquid phase and the first reducing agent reacting within the zinc reducing mixture to form a zinc reduced residual solid phase and a zinc reduced liquid phase;
    d) separating from said zinc reducing mixture, said zinc reduced liquid phase and said zinc reduced residual solid phase, the zinc reduced liquid phase substantially containing the zinc component of said raw material, and the zinc reduced residual solid phase substantially containing the cadmium component of said raw material, the copper component of said raw material, and the chromium component of said raw material;

e) fractionally crystallizing said zinc reduced liquid phase to form a zinc depleted mother liquor and a zinc rich bionutrient crystal product, the zinc rich bionutrient crystal product substantially containing the zinc component of said raw material, and the zinc depleted mother liquor substantially containing the cadmium component of said raw material, the copper component of said raw material, and the chromium component of said raw material;

f) combining said zinc rich bionutrient crystal product with water to form a zinc rich bionutrient solution;

g) leaching said first residual solid phase with a second acid, to form a second leaching mixture, the second leaching mixture including a second leached liquid phase and a second residual solid phase, and the second leaching mixture having a pH less than approximately pH 1.0;

h) separating from said second leaching mixture, said second leached liquid phase and said second residual solid phase, the second leached liquid phase substantially including the iron component of said raw material;

i) combining said second leached liquid phase with a second reducing agent to form an iron reduced mixture, the second leached liquid phase and the second reducing agent reacting within the iron reducing mixture to form an iron reduced solid phase and an iron reduced liquid phase;

j) separating from said iron reducing mixture, said iron reduced liquid phase and said iron reduced solid phase, the iron reduced liquid phase substantially containing the iron component of said raw material, and the iron reduced solid phase substantially containing the cadmium component of said raw material, the copper component of said k) fractionally crystallizing said iron reduced liquid phase to form an iron depleted mother liquor and an iron rich bionutrient crystal product, the iron rich bionutrient crystal product substantially containing the iron component of said raw material, the iron depleted mother liquor substantially containing the cadmium component, the copper component, and the chromium component of said raw material;

l) combining said iron rich bionutrient crystal product with water to form an iron rich bionutrient solution;

m) determining a zinc concentration of said zinc rich bionutrient solution;

n) determining an iron concentration of said iron rich bionutrient solution; and o) combining a selected ratio of said zinc rich bionutrient solution and said iron rich bionutrient solution to form a combined bionutrient solution having a selected zinc concentration and a selected iron concentration.

2. The process of claim 1, including additional process steps for separating and recovering a lead product and a gypsum product from the second residual solid phase, comprising the steps of:

p) initially combining a first acidified sodium chloride solution and said second residual solid phase of the second leaching mixture to form a first acidified salt mixture, and later combining into the first acidified salt mixture, a first recycle liquid phase and additional quantities of the second residual solid phase during continuous operation, the first acidified salt mixture separable into a first liquid phase and a first solid phase, said first acid of the first leaching mixture of the first residual solid phase including a first sulfuric acid, second acid of second leaching mixture of said second residual solid phase including a second sulfuric acid said raw material including a calcium component and a lead component the first sulfuric acid substantially digesting the calcium component of the raw material in the first leaching mixture forming a first gypsum, and the second sulfuric acid further digesting the calcium component remaining in the second leaching mixture forming a second gypsum;

q) separating the first solid phase from said first acidified salt mixture, the first solid phase substantially including the second gypsum;

r) separating said first liquid from the first acidified salt mixture, the first liquid phase substantially containing the lead component of said raw material;

s) initially combining a second acidified sodium chloride solution and said first solid phase to form a second acidified salt mixture, and later combining into he second acidified salt mixture, a second recycle liquid phase and additional quantities of the first solid phase during continuous operation, said second acidified salt mixture separable into said first recycle liquid phase and a second solid phase;

t) separating from said second acidified salt mixture, the first recycle liquid phase and the second solid phase, the second solid phase substantially including the calcium component of said raw material, the calcium component in the form of the second gypsum;

u) initially combining a third acidified sodium chloride solution and said second solid phase to form a third acidified salt mixture, and later combining into the third acidified salt mixture, a sodium chloride saturated liquid phase and additional quantities of the second solid phase during continuous operation, said third acidified salt mixture separable into the second recycle liquid phase and a third solid phase;

v) separating from said third acidic salt mixture the second recycle liquid phase and the third solid phase, the third solid phase substantially including the second gypsum;

w) combining said first liquid phase with a sodium carbonate, to form a lead rich mixture, the lead component and the chlorine of the first liquid phase and the sodium carbonate substantially reacting to form a chlorine rich liquid phase, a lead rich solid phase, and with the lead component substantially in the form of a lead carbonate within the lead rich mixture;

x) separating from said lead rich mixture the chlorine rich liquid phase and the lead rich solid phase, the lead rich solid phase substantially including the lead carbonate; and y) combining said chlorine rich liquid phase with a sodium chloride to form said sodium chloride saturated liquid phase for use in forming said third acidic salt mixture.

3. A process for forming a bionutrient solution having a specific iron concentration and a specific zinc concentration, comprising the steps of:

a) leaching a raw material with a first acid to form a first leaching mixture, the first leached mixture having a pH greater than approximately pH 1.0, the first leached mixture including a first leached liquid phase and a first residual solid phase, and the raw material including a zinc component, a cadmium component, a copper component, and a chromium component;

b) separating from said first leaching mixture, said first leached liquid phase and said first residual solid phase, the first leached liquid phase substantially including the zinc component of said raw material;

c) combining said first leached liquid phase with a first reducing agent to form a zinc reducing mixture, the first leaching liquid phase and the first reducing agent reacting within the zinc reducing mixture to form a zinc reduced residual solid phase and a zinc reduced liquid phase;

d) separating from said zinc reducing mixture, said zinc reduced liquid phase and said zinc reduced residual solid phase, the zinc reduced liquid phase substantially containing the zinc component of said raw material, and the zinc reduced residual solid phase substantially containing the cadmium component of said raw material, the copper component of said raw material, and the chromium component of said raw material; and e) fractionally crystallizing said zinc reduced liquid phase to form a zinc depleted mother liquor and a zinc rich bionutrient crystal product, the zinc rich bionutrient crystal product substantially containing the zinc component of said raw material, and the zinc depleted mother liquor substantially containing the cadmium component of said raw material, the copper component of said raw material, and the chromium component of said raw material.

4. The process of claim 3, including the additional process step of:

f) combining said zinc rich bionutrient crystal product with water to form a zinc rich bionutrient solution.

5. The process of claim 4, including the additional process step of:

g) determining a zinc concentration of said zinc rich bionutrient solution.

6. The process of claim 3, including the additional process step of:

f) leaching said first residual solid phase with a second acid, to form a second leaching mixture, the second leaching mixture including a second leached liquid phase and a second residual solid phase, and the second leaching mixture having a pH less than approximately pH 1.0.

7. The process of claim 6, including the additional process step of g) separating from said second leaching mixture, said second leached liquid phase and said second residual solid phase, wherein said raw material includes an iron component, and the second leached liquid phase substantially includes the iron component of said raw material.

8. The process of claim 7, including the additional process step of:

h) combining said second leached liquid phase with a second reducing agent to form an iron reducing mixture, the second leached liquid phase and the second reducing agent reacting within the iron reducing mixture to form an iron reduced solid phase and an iron reduced liquid phase.

9. The process of claim 8, including the additional process step of:

i) separating from said iron reducing mixture, said iron reduced liquid phase and said iron reduced solid phase, the iron reduced liquid phase substantially containing the iron component of said raw material, and the iron reduced solid phase substantially containing the cadmium component of said raw material, the copper component of said raw material, and the chromium component of said raw material.

10. The process of claim 9, including the additional process step of:

j) fractionally crystallizing said iron reduced liquid phase to form an iron depleted mother liquor and an iron rich bionutrient crystal product, the iron rich bionutrient crystal product substantially containing the iron component of said raw material, the iron depleted mother liquor substantially containing the cadmium component, the copper component, and the chromium component of said raw material.

11. The process of claim 10, including the additional process step of:

k) combining said iron rich bionutrient crystal product with water to form an iron rich bionutrient solution.

12. The process of claim 11, including the additional process steps of:

l) combining said zinc rich bionutrient crystals with water to form a zinc rich bionutrient solution;

m) determining a zinc concentration of said zinc rich bionutrient solution;

n) determining an iron concentration of said iron rich bionutrient solution; and o) combining a selected ratio of said zinc rich bionutrient solution and said iron rich bionutrient solution to form a combined bionutrient solution having a selected zinc concentration and a selected iron concentration.

13. The process of claim 3, including additional process steps for separating and recovering lead and gypsum, comprising the steps of:

f) initially combining a first acidified sodium chloride solution and said second residual solid phase to form a first acidified salt mixture, and later combining into the first acidified salt mixture, a first recycle liquid phase and additional quantities of the second residual solid phase during continuous operation, the acidified salt mixture separable into a first liquid phase and a first solid phase, wherein said first acid of the first leaching mixture of the first residual solid includes a first sulfuric acid, said second acid of the second leaching mixture of said second residual solid phase includes a second sulfuric acid, said raw material includes a calcium component and a lead component the first sulfuric acid substantially digesting the calcium component of the raw material in the first leaching mixture forming a first gypsum, and the second sulfuric acid further digesting the calcium component remaining in the second leaching mixture forming a second gypsum; and g) separating the first solid phase from said first acidified salt mixture, the first solid phase substantially including a calcium component of said raw material, the calcium component in the form of a the second gypsum; and h) separating said first liquid phase from the first acidified salt mixture, the first liquid phase substantially containing the lead component of said raw material.

14. The process of claim 13, including the additional process steps of;

i) combining said first liquid phase with a sodium carbonate, to form a lead rich mixture, the lead component and the chlorine of the first liquid phase and the sodium carbonate substantially reacting to form a chlorine rich liquid phase and a lead rich solid phase within the lead rich mixture; and j) separating from said lead rich mixture the chlorine rich liquid phase and the lead rich solid phase, the lead rich solid phase including the lead component of said raw material, the lead component in the form of a lead carbonate.

15. The process of claim 13, including the additional process steps of:

i) initially combining a second acidified sodium chloride solution and said first solid phase to form a second acidified salt mixture, and later combining into the second acidified salt mixture, a second recycle liquid phase and additional quantities of the first solid phase during continuous operation, said second acidified salt mixture including said first recycle liquid phase and a second solid phase; and j) separating from said second acidified salt mixture, the first recycle liquid phase and the second solid phase, the second solid phase substantially including the second gypsum.

16. The process of claim 15, including the additional process steps of:

k) initially combining a third acidified sodium chloride solution and said second solid phase to form a third acidified salt mixture, and later combining into the third acidified salt mixture, a sodium chloride saturated liquid phase and additional quantities of the second solid phase during continuous operation, said third acidified salt mixture separable into the second recycle liquid phase and a third solid phase; and l) separating from said third acidic salt mixture the second recycle liquid phase and the third solid phase, the third solid phase substantially including the second gypsum.

17. The process of claim 16, including the additional process steps of:

m) combining said first liquid phase with a sodium carbonate, to form a lead rich mixture, the lead component and the chlorine of the first liquid phase and the sodium carbonate reacting to form a chlorine rich liquid phase, a lead rich solid phase, and with the lead component substantially in the form of a lead carbonate within the lead rich mixture;

n) separating from said lead rich mixture the chlorine rich liquid phase and the lead rich solid phase, the lead rich solid phase including the lead carbonate; and o) combining said chlorine rich liquid phase with a sodium chloride to form said sodium chloride saturated liquid phase for use in forming said third acidic salt mixture.

* * * * *

UNITED STATES PATENT AND TRADEMARK OFFICE
CERTIFICATE OF CORRECTION

PATENT NO. : 5,788,740
DATED : August 4, 1998
INVENTOR(S) : Robert Chase

It is certified that error appears in the above-identified patent and that said Letters Patent is hereby corrected as shown below:

At column 8, line 17, change "beat" to --heat--;
At column 8, line 19, change "beat" to --heat--;
At column 9, line 28, change "1800 °F to 2000 °F" to --180 °F to 200 °F--;

At column 46, line 24, change "he" to --the--;
At column 48, line 45, after the word "solid" insert --phase--; and
At column 48, line 58, delete "a calcium component of said raw material, the calcium component in the form of".

Signed and Sealed this

Thirtieth Day of March, 1999

Attest:

Q. TODD DICKINSON

*Attesting Officer*  Acting Commissioner of Patents and Trademarks